United States Patent
Lau et al.

(10) Patent No.: US 10,073,867 B2
(45) Date of Patent: Sep. 11, 2018

(54) SYSTEM AND METHOD FOR CODE GENERATION FROM A DIRECTED ACYCLIC GRAPH USING KNOWLEDGE MODULES

(71) Applicant: Oracle International Corporation, Redwood Shores, CA (US)

(72) Inventors: Thomas Lau, Mountain View, CA (US); David Allan, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 869 days.

(21) Appl. No.: 14/077,135

(22) Filed: Nov. 11, 2013

(65) Prior Publication Data
US 2014/0344778 A1 Nov. 20, 2014

Related U.S. Application Data

(60) Provisional application No. 61/824,976, filed on May 17, 2013, provisional application No. 61/824,979, filed on May 17, 2013.

(51) Int. Cl.
*G06F 8/35* (2018.01)
*G06F 17/30* (2006.01)
(Continued)

(52) U.S. Cl.
CPC .......... *G06F 17/30292* (2013.01); *G06F 8/35* (2013.01); *G06F 8/20* (2013.01);
(Continued)

(58) Field of Classification Search
CPC .............. G06F 17/30557; G06F 17/30563
See application file for complete search history.

(56) References Cited

U.S. PATENT DOCUMENTS 6,151,608 A 11/2000 Abrams
6,487,706 B1 * 11/2002 Barkley .............. G06F 17/5077
716/112
(Continued)

OTHER PUBLICATIONS

Final Office Action dated Mar. 9, 2016 for U.S. Appl. No. 14/077,140, 18 pages.
(Continued)

*Primary Examiner* — Isaac T Tecklu
(74) *Attorney, Agent, or Firm* — Kilpatrick Townsend & Stockton LLP

(57) ABSTRACT

In various embodiments, a data integration system is disclosed which enables users to create a logical design which is platform and technology independent. The user can create a logical design that defines, at a high level, how a user wants data to flow between sources and targets. The tool can analyze the logical design, in view of the user's infrastructure, and create a physical design. The logical design can include a plurality of components corresponding to each source and target in the design, as well as operations such as joins or filters, and access points. Each component when transferred to the physical design generates code to perform operations on the data. Depending on the underlying technology (e.g., SQL Server, Oracle, Hadoop, etc.) and the language used (SQL, pig, etc.) the code generated by each component may be different.

25 Claims, 28 Drawing Sheets

(51) Int. Cl.
*G06F 8/20* (2018.01)
*G06F 8/34* (2018.01)

(52) U.S. Cl.
CPC .......... *G06F 8/34* (2013.01); *G06F 17/30557* (2013.01); *G06F 17/30563* (2013.01)

(56) References Cited

U.S. PATENT DOCUMENTS

| | | | |
|---|---|---|---|
| 6,643,836 B2 * | 11/2003 | Wheeler | G06F 17/5045 703/16 |
| 6,721,713 B1 * | 4/2004 | Guheen | G06Q 99/00 705/1.1 |
| 7,343,585 B1 | 3/2008 | Lau et al. | |
| 7,343,593 B2 | 3/2008 | Humpert et al. | |
| 7,480,676 B2 | 1/2009 | Wald | |
| 7,739,267 B2 * | 6/2010 | Jin | G06F 17/30563 707/714 |
| 7,984,043 B1 | 7/2011 | Waas | |
| 8,055,651 B2 | 11/2011 | Barsness et al. | |
| 8,307,354 B2 * | 11/2012 | Haga | G06F 21/14 705/57 |
| 8,566,318 B1 | 10/2013 | Sacco | |
| 8,775,588 B2 | 7/2014 | Liu et al. | |
| 9,158,827 B1 * | 10/2015 | Vu | G06F 17/30563 |
| 2002/0026630 A1 | 2/2002 | Schmidt et al. | |
| 2003/0140126 A1 * | 7/2003 | Budhiraja | G06F 9/44536 709/220 |
| 2003/0154191 A1 | 8/2003 | Fish et al. | |
| 2003/0172145 A1 * | 9/2003 | Nguyen | G06Q 10/10 709/223 |
| 2004/0111712 A1 | 6/2004 | Humpert et al. | |
| 2005/0065952 A1 | 3/2005 | Dettinger et al. | |
| 2005/0131877 A1 | 6/2005 | Ghosh et al. | |
| 2005/0256892 A1 * | 11/2005 | Harken | G06F 17/303 |
| 2006/0025987 A1 | 2/2006 | Baisley et al. | |
| 2006/0069717 A1 * | 3/2006 | Mamou | G06Q 10/10 709/203 |
| 2006/0224637 A1 | 10/2006 | Wald | |
| 2006/0242195 A1 | 10/2006 | Bove et al. | |
| 2007/0074155 A1 * | 3/2007 | Ama | G06F 17/30563 717/106 |
| 2007/0079299 A1 * | 4/2007 | Daly | G06F 8/30 717/141 |
| 2007/0143250 A1 | 6/2007 | Zigon | |
| 2008/0065466 A1 * | 3/2008 | Liu | G06F 8/10 705/348 |
| 2008/0281849 A1 * | 11/2008 | Mineno | G06F 17/30566 |
| 2009/0164197 A1 | 6/2009 | Matthews et al. | |
| 2009/0319544 A1 * | 12/2009 | Griffin | G06F 17/30563 |
| 2010/0057673 A1 * | 3/2010 | Savov | G06F 17/30569 707/E17.002 |
| 2011/0047525 A1 | 2/2011 | Castellanos et al. | |
| 2011/0246530 A1 * | 10/2011 | Malafsky | G06N 5/022 707/794 |
| 2012/0030311 A1 | 2/2012 | Refai et al. | |
| 2014/0280023 A1 | 9/2014 | Jagtap et al. | |

OTHER PUBLICATIONS

Non-Final Office Action dated Oct. 22, 2015, in U.S. Appl. No. 14/077,140, 14 pages.
Notice of Allowance for U.S. Appl. No. 14/077,140, dated Dec. 20, 2016, 12 pages.
Wilkinson, et al., "Designing Integration Flows Using Hypercubes," Proceedings of the 14th International Conference on Extending Database Technology, Mar. 21-24, 2011, pp. 503-508, [retrieved on Dec. 13, 2016], Retrieved from the Internet: <URL:http://dl.acm.org/>.
Dayal, et al. "Data Integration Flows for Business Intelligence," Proceedings of the 12th International Conference on Extending Database Technology: Advances in Database Technology, Mar. 24-26, 2009, pp. 1-11, [retrieved on Dec. 13, 2016], Retrieved from the Internet: <URL:http://dl.acm.org/>.
Oracle Airlines Data Model: Implementation and Operations Guide 11g Release 2 (11.2), E26211-02, Dec. 2011, 114 pages, [retrieved on Dec. 13, 2016], Retrieved from the Internet: URL:https://docs.oracle.com/cd/E11882_01/doc.112/e265211.pdf>.
U.S. Appl. No. 14/077,140, Non-Final Office Action dated Aug. 12, 2016, 20 pages.

* cited by examiner

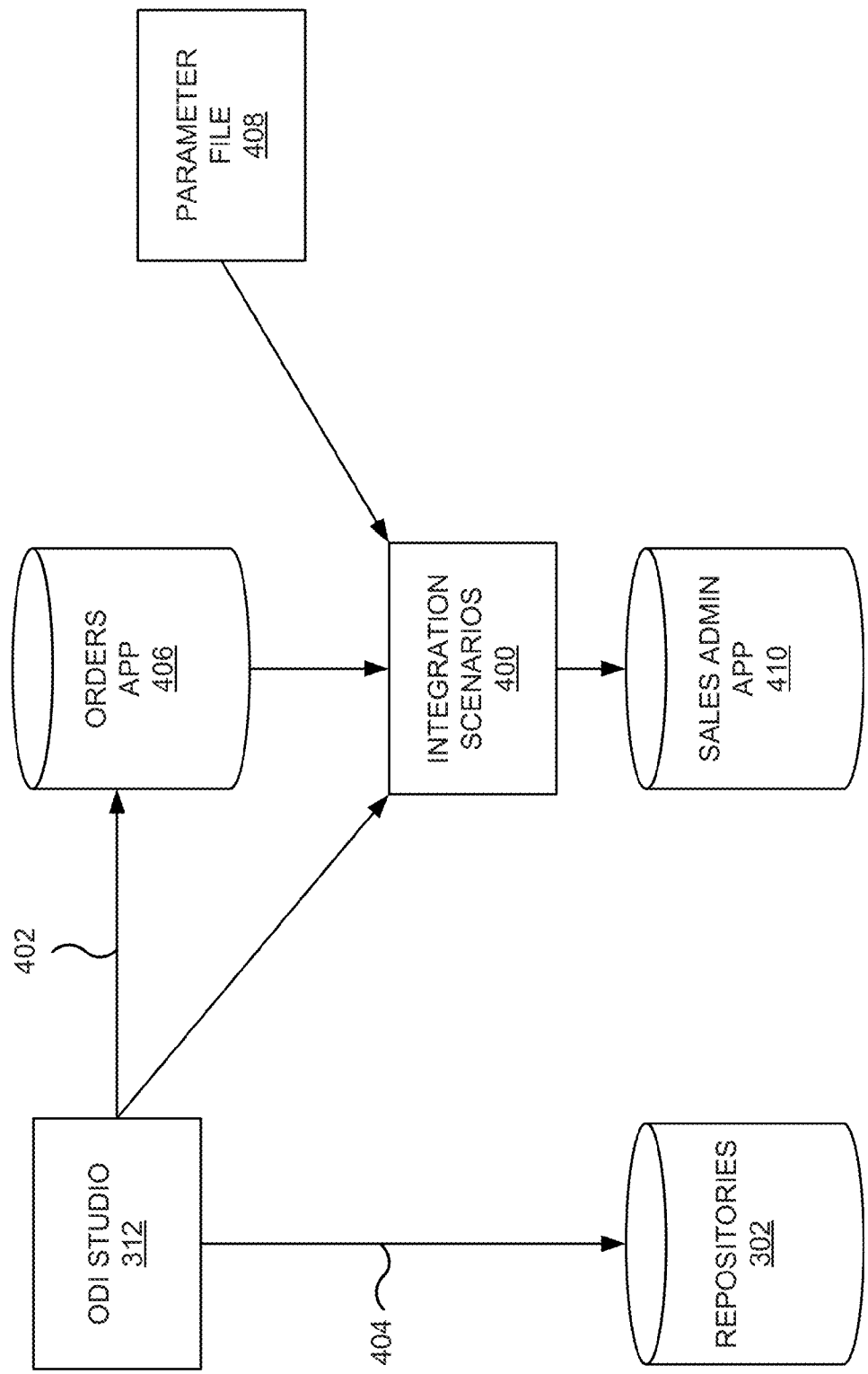

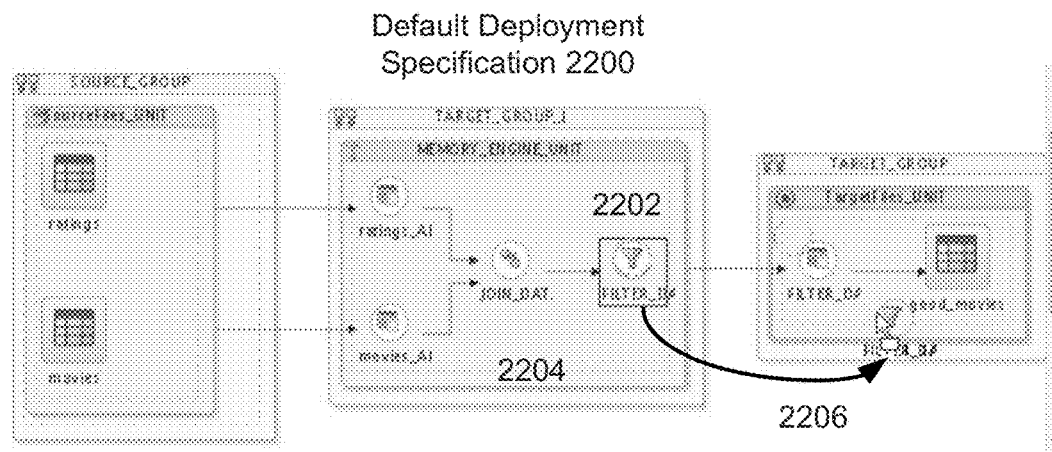
Default Deployment Specification 2200
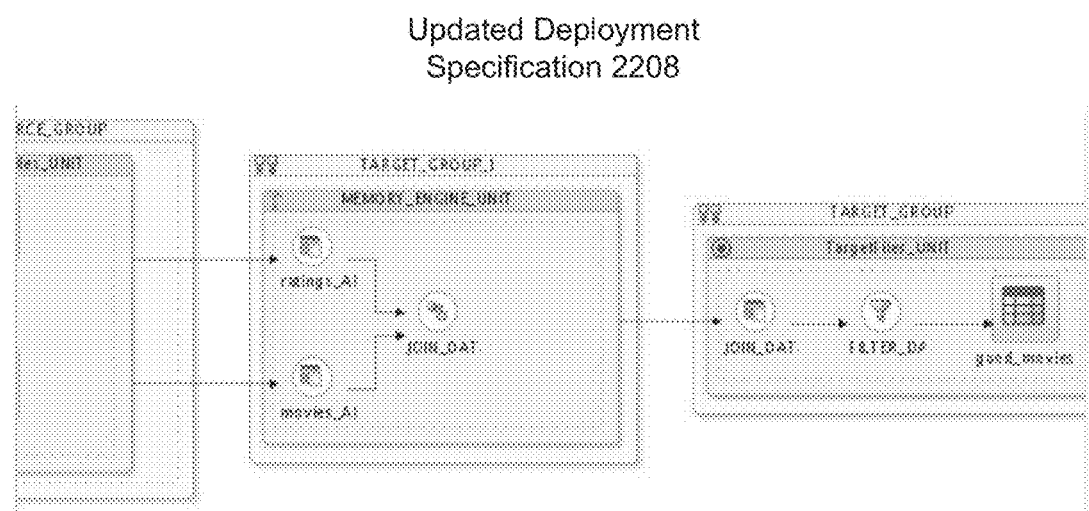
Updated Deployment Specification 2208
FIG. 22

SYSTEM AND METHOD FOR CODE GENERATION FROM A DIRECTED ACYCLIC GRAPH USING KNOWLEDGE MODULES

CROSS-REFERENCES TO RELATED APPLICATIONS

This application claims priority to U.S. Provisional Patent Application No. 61/824,976, filed on May 17, 2013, titled "SYSTEM AND METHOD FOR DECOMPOSITION OF CODE GENERATION INTO SEPARATE PHYSICAL UNITS THROUGH EXECUTION UNITS," by Ganesh Seetharaman et al.; claims priority to U.S. Provisional Patent Application No. 61/824,979, filed on May 17, 2013, titled "SYSTEM AND METHOD FOR CODE GENERATION FROM A DIRECTED ACYCLIC GRAPH USING KNOWLEDGE MODULES," by David Allan et al.; and is related to U.S. patent application Ser. No. 14/077,140, filed on Nov. 11, 2013, titled "SYSTEM AND METHOD FOR DECOMPOSITION OF CODE GENERATION INTO SEPARATE PHYSICAL UNITS THROUGH EXECUTION UNITS," by Ganesh Seetharaman et al., each of which is herein incorporated by reference in its entirety for all purposes.

BACKGROUND OF THE INVENTION

In today's increasingly fast-paced business environment, organizations need to use more specialized software applications. Additionally, organizations need to ensure the coexistence of these applications on heterogeneous hardware platforms and systems and guarantee the ability to share data between applications and systems.

Accordingly, what is desired is to solve problems relating to developing data integration scenarios, some of which may be discussed herein. Additionally, what is desired is to reduce drawbacks relating to developing data integration scenarios, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, a data integration system enables users to create a logical design which is platform and technology independent. The user can create a logical design that defines, at a high level, how a user wants data to flow between sources and targets. The tool can analyze the logical design, in view of the user's infrastructure, and create a physical design. The logical design can include a plurality of components corresponding to each source and target in the design, as well as operations such as joins or filters. Each component when transferred to the physical design generates code to perform operations on the data. Knowledge modules associated with the components can generate the code based on the underlying technology (e.g., SQL Server, Oracle, Hadoop, etc.) and the language used (SQL, pig, etc.).

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 4 is a block diagram of an environment having various heterogeneous data sources for which data integration scenarios may be created in various embodiments of the present invention.

FIG. 22 illustrates a user interface for dynamically creating alternative physical designs of a data integration mapping, in accordance with an embodiment of the present invention.

DETAILED DESCRIPTION OF THE INVENTION

Introduction

In various embodiments, a data integration system enables users to create a logical design which is platform and technology independent. The user can create a logical design that defines, at a high level, how a user wants data to flow between sources and targets. The tool can analyze the logical design, in view of the user's infrastructure, and create a physical design. The logical design can include a plurality of components corresponding to each source and target in the design, as well as operations such as joins or filters. Each component when transferred to the physical design generates code to perform operations on the data. Depending on the underlying technology (e.g., SQL Server, Oracle, Hadoop, etc.) and the language used (SQL, pig, etc.) the code generated by each component may be different.

In one aspect, a user of data integration system is not required to specify all data attributes at each component in the logical design, from start to end. The data integration system provides a plurality of component types, such as projector and selector types, that avoid the need to fully declare the information that flows through the logical design. The data integration system is able to decide what attributes are needed at operations represented by predetermined component types. This simplifies both the design and maintenance.

Figure 1:
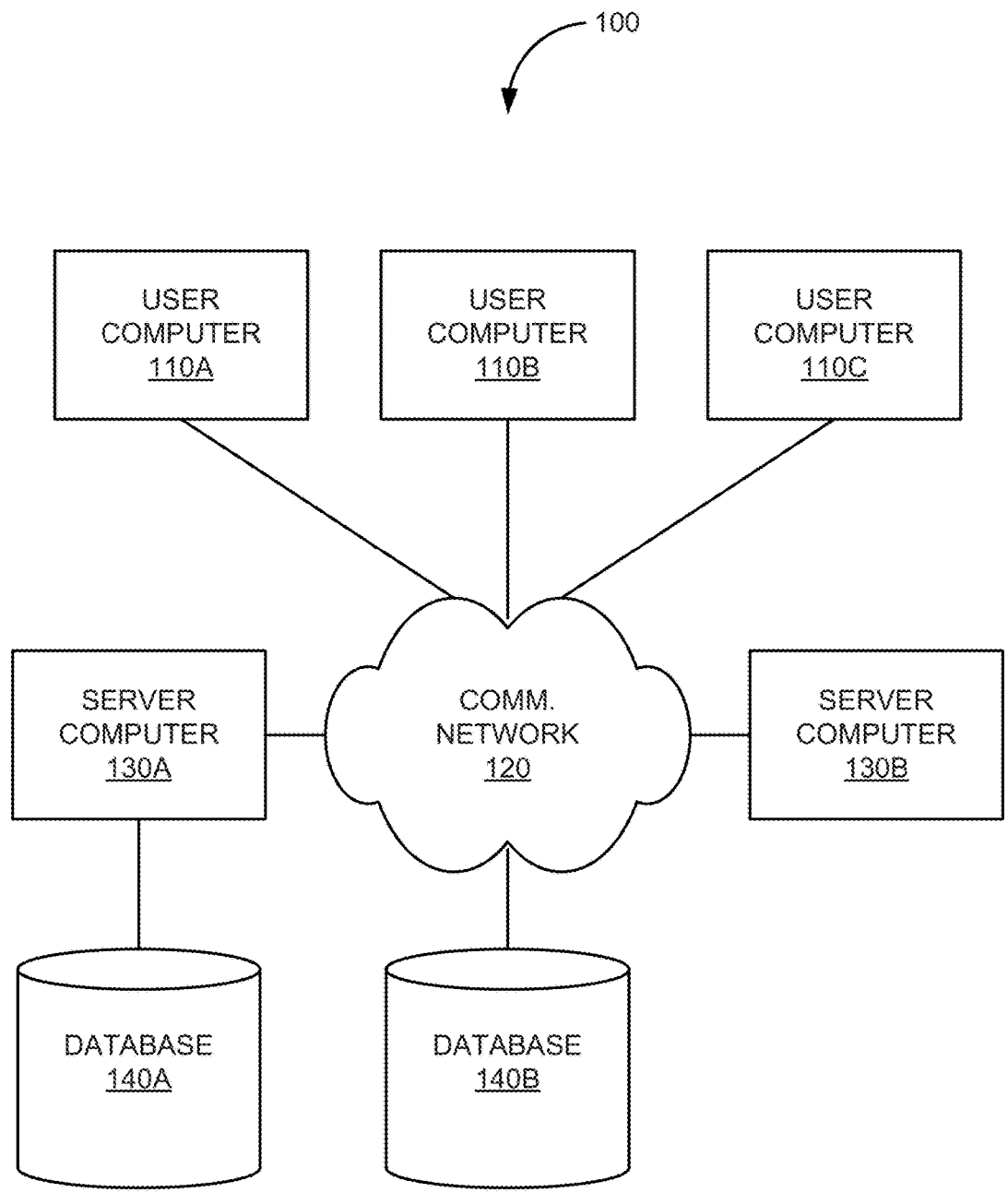
FIG. 1 is a simplified illustration of a system that may incorporate an embodiment of the present invention.

FIG. 1 is a simplified illustration of system 100 that may incorporate an embodiment or be incorporated into an embodiment of any of the innovations, embodiments, and/or examples found within this disclosure. System 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially-available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially-available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one or more file and/or application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 140 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

Data Integration Overview

Figure 2:
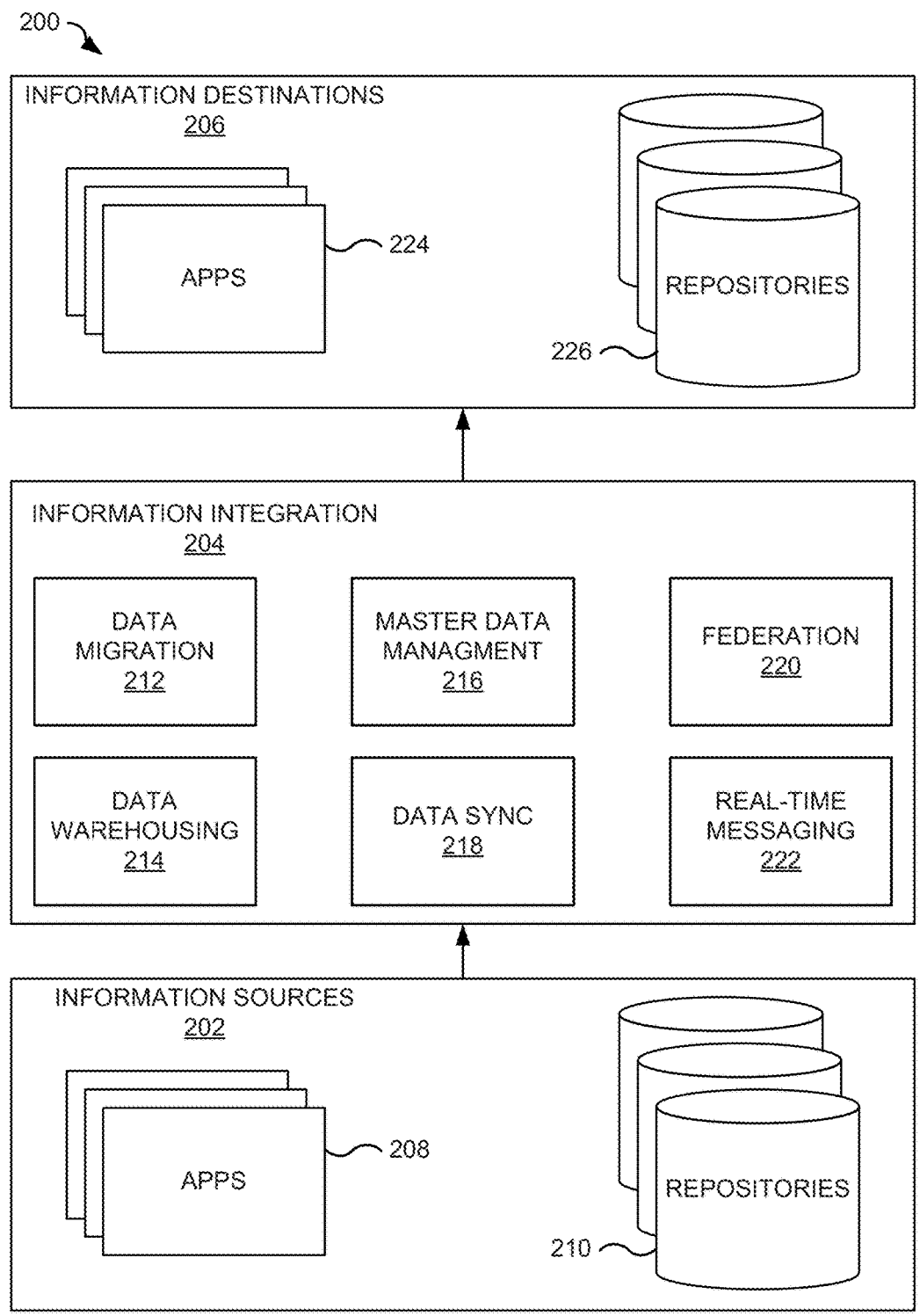
FIG. 2 is a block diagram of a data integration system according to an embodiment of the present invention.

FIG. 2 is a simplified block diagram of data integration system 200 according to an embodiment of the present invention. FIG. 2 is a simplified illustration of data integration system 200 that may incorporate various embodiments or implementations of the one or more inventions presented within this disclosure. FIG. 2 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

In this embodiment, data integration system 200 includes information sources 202, information integration 204, and information destinations 206. In general, information flows from information sources 202 to information integration 204 whereby the information may be consumed, made available, or otherwise used by information destinations 206. Data flows may be unidirectional or bidirectional. In some embodiments, one or more data flows may be present in data integration system 200.

Information sources 202 are representative of one or more hardware and/or software elements configured to source data. Information sources 202 may provide direct or indirect access to the data. In this embodiment, information sources 202 include one or more applications 208 and one or more repositories 210.

Applications 208 are representative of traditional applications, such as desktop, hosted, web-based, or cloud-based applications. Applications 208 may be configured to receive, process, and maintain data for one or more predetermined purposes. Some examples of applications 208 include customer relationship management (CRM) applications, financial services applications, government and risk compliance applications, human capital management (HCM), procurement applications, supply chain management applications, project or portfolio management applications, or the like. Applications 208 may include functionality configured for manipulating and exporting application data in a variety of human-readable and machine-readable formats, as is known in the art. Applications 208 may further access and store data in repositories 210.

Repositories 210 are representative of hardware and/or software elements configured to provide access to data. Repositories 210 may provide logical and/or physical partitioning of data. Repositories 210 may further provide for reporting and data analysis. Some examples of repositories 210 include databases, data warehouses, cloud storage, or the like. A repository may include a central repository created by integrating data from one or more applications 208. Data stored in repositories 210 may be uploaded from an operational system. The data may pass through additional operations before being made available in a source.

Information integration 204 is representative of one or more hardware and/or software elements configured to provide data integration services. Direct or indirect data integration services can be provided in information integration 204. In this embodiment, information integration 204 includes data migration 212, data warehousing 214, master data management 216, data synchronization 218, federation 220, and real-time messaging 222. It will be understood that information integration 204 can include one or more modules, services, or other additional elements than those shown in here that provide data integration functionality.

Data migration 212 is representative of one or more hardware and/or software elements configured to provide data migration. In general, data migration 212 provides one or more processes for transferring data between storage types, formats, or systems. Data migration 212 usually provides for manual or programmatic options to achieve a migration. In a data migration procedure, data on or provided by one system is mapped to another system providing a design for data extraction and data loading. A data migration may involve one or more phases, such a design phase where one or more designs are created that relate data formats of a first system to formats and requirements of a second system, a data extraction phase where data is read from the first system, a data cleansing phase, and a data loading phase where data is written to the second system. In some embodiments, a data migration may include a data verification phases to determine whether data is accurately processed in any of the above phases.

Data warehousing 214 is representative of one or more hardware and/or software elements configured to provide databases used for reporting and data analysis. A data warehouse is typically viewed as a central repository of data which is created by integrating data from one or more disparate sources. Data warehousing 214 may include the current storage of data as well as storage of historical data. Data warehousing 214 may include typical extract, transform, load (ETL)-based data warehouse whereby staging, data integration, and access layers house key functions. In one example, a staging layer or staging database stores raw data extracted from each of one or more disparate source data systems. An integration layer integrates disparate data sets by transforming the data from the staging layer often storing this transformed data in an operational data store (ODS) database. The integrated data is then moved to yet another database, often called the data warehouse database. The data can be arranged into hierarchical groups (often called dimensions) and into facts and aggregate facts. An access layer may be provided to help users or other systems retrieve data. Data warehouses can be subdivided into data marts whereby each data mart stores subsets of data from a warehouse. In some embodiments, data warehousing 214 may include business intelligence tools, tools to extract, transform and load data into the repository, and tools to manage and retrieve metadata.

Master data management 216 is representative of one or more hardware and/or software elements configured to manage a master copy of data. Master data management 216 may include a set of processes, governance, policies, standards and tools that consistently define and manage master data. Master data management 216 may include functionality for removing duplicates, standardizing data, and incorporating rules to eliminate incorrect data from entering a system in order to create an authoritative source of master data. Master data management 216 may provide processes for collecting, aggregating, matching, consolidating, quality-assuring, persisting and distributing data throughout an organization to ensure consistency and control in the ongoing maintenance and application use of information.

Data synchronization 218 is representative of one or more hardware and/or software elements configured to synchronize data. Data synchronization 218 may provide for establishing consistency among data from a source to a target and vice versa. Data synchronization 218 may further provide for the continuous harmonization of the data over time.

Federation 220 is representative of one or more hardware and/or software elements configured to consolidate a view of data from constituent sources. Federation 220 may transparently map multiple autonomous database systems into a single federated database. The constituent databases maybe interconnected via a computer network and may be geographically decentralized. Federation 220 provides an alternative to merging several disparate databases. A federated database, or virtual database, for example, may provide a composite of all constituent databases. Federation 220 may not provide actual data integration in the constituent disparate databases but only in the view.

Federation 220 may include functionality that provides a uniform user interface, enabling users and clients to store and retrieve data in multiple noncontiguous databases with a single query—even if the constituent databases are heterogeneous. Federation 220 may include functionality to decompose a query into subqueries for submission to relevant constituent data sources and composite the result sets of the subqueries. Federation 220 can include one or more wrappers to the subqueries to translate them into appropriate query languages. In some embodiments, federation 220 is a collection of autonomous components that make their data available to other members of the federation through the publication of an export schema and access operations.

Real-time messaging 222 is representative of one or more hardware and/or software elements configured to provide messaging services subject to a real-time constraint (e.g., operational deadlines from event to system response). Real-time messaging 222 may include functionality that guarantees an action or response within strict time constraints. In one example, real-time messaging 222 may be tasked with taking some orders and customer data from one database, combining it with some employee data held in a file, and then loading the integrated data into a Microsoft SQL Server 2000 database. Because orders need to be analyzed as they arrive, real-time messaging 222 may pass the orders through to a target database in as close to real time as possible and extract only the new and changed data to keep the workload as small as possible.

Information destinations 206 are representative of one or more hardware and/or software elements configured to store or consume data. In this embodiment, information destinations 206 may provide direct or indirect access to the data. In this embodiment, information destinations 206 include one or more applications 224 and one or more repositories 226.

Applications 224 are representative of traditional applications, such as desktop, hosted, web-based, or cloud-based applications. Applications 224 may be configured to receive, process, and maintain data for one or more predetermined purposes. Some examples of applications 224 include customer relationship management (CRM) applications, financial services applications, government and risk compliance applications, human capital management (HCM), procurement applications, supply chain management applications, project or portfolio management applications, or the like. Applications 224 may include functionality configured for manipulating and importing application data in a variety of human-readable and machine-readable formats, as is known in the art. Applications 224 may further access and store data in repositories 226.

Repositories 226 are representative of hardware and/or software elements configured to provide access to data. Repositories 226 may provide logical and/or physical partitioning of data. Repositories 226 may further provide for reporting and data analysis. Some examples of repositories 226 include databases, data warehouses, cloud storage, or the like. A repository may include a central repository created by integrating data from one or more applications 226. Data stored in repositories 226 may be uploaded or imported through information integration 204. The data may pass through additional operations before being made available at a destination.

Data Integration System

Figure 3:
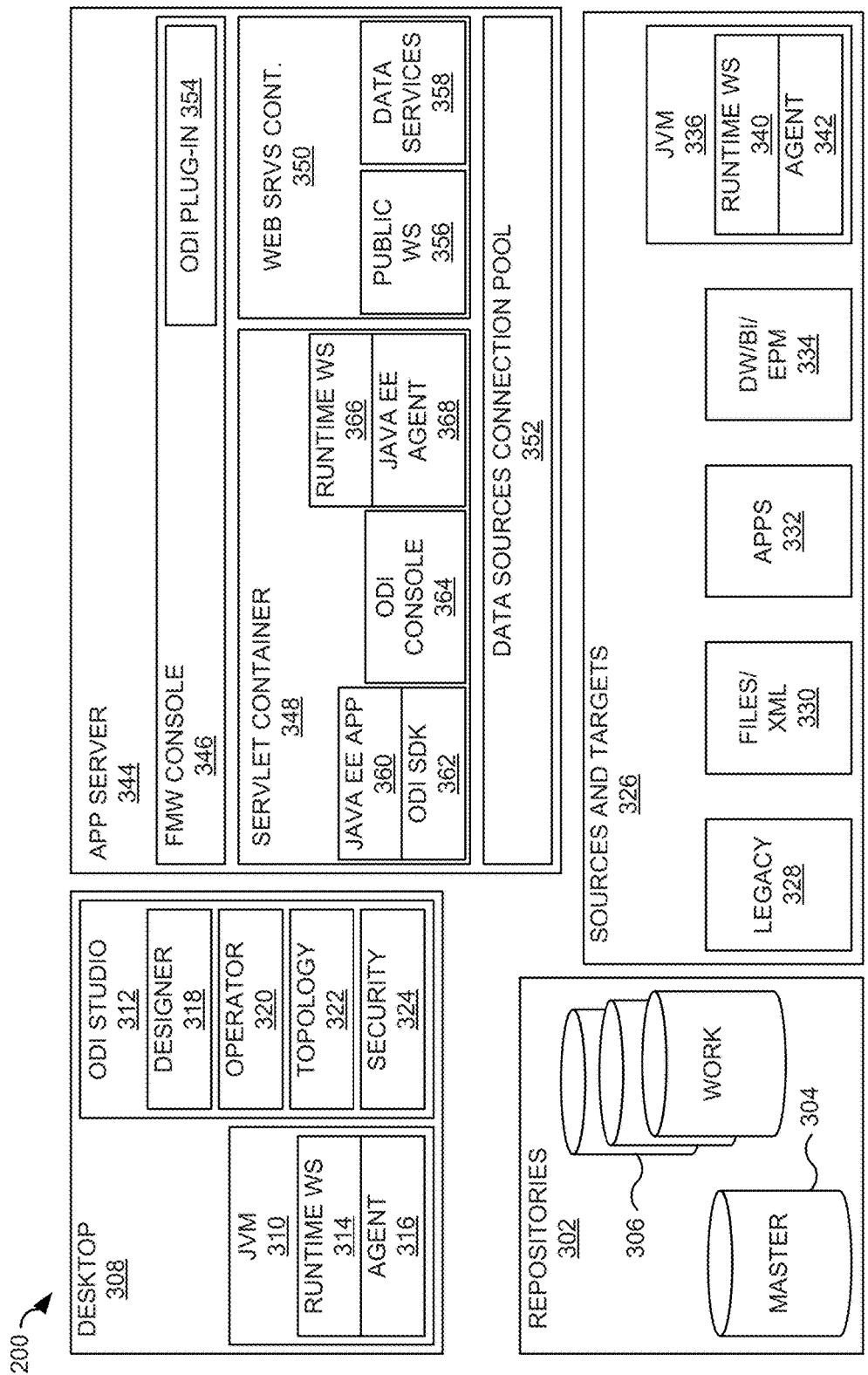
FIG. 3 is a simplified block diagram of a hardware/software stack that may be used to implement a data integration system according to an embodiment of the present invention.

FIG. 3 is a simplified block diagram of a hardware/software stack that may be used to implement data integration system 200 according to an embodiment of the present invention. FIG. 3 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures. One example of components found within data integration system 200 according to this embodiment may include ORACLE DATA INTEGRATOR, a member of the ORACLE FUSION Middleware family of products provided by Oracle of Redwood Shores, Calif. ORACLE DATA INTEGRATOR is a Java-based application that uses one or more databases to perform set-based data integration tasks. In addition, ORACLE DATA INTEGRATOR can extract data, provide transformed data through Web services and messages, and create integration processes that respond to and create events in service-oriented architectures.

In various embodiments, data integration system 200 provides a new declarative design approach to defining data transformation and integration processes, resulting in faster and simpler development and maintenance. Data integration system 200 thus separates declarative rules from the implementation details. Data integration system 200 further provides a unique E-LT architecture (Extract-Load Transform) for the execution of data transformation and validation processes. This architecture in embodiments eliminates the need for a standalone ETL server and proprietary engine. In some embodiments, data integration system 200 instead leverages the inherent power of RDBMS engines.

In some embodiments, data integration system 200 integrates in one or more middleware software packages, such as the ORACLE FUSION MIDDLEWARE platform and becomes a component of the middleware stack. As depicted in FIG. 3 data integration system 200 may provide run-time components as Java EE applications.

In this example, one component of data integration system 200 is repositories 302. Repositories 302 are representative of hardware and/or software elements configured to store configuration information about an IT infrastructure, metadata of all applications, projects, scenarios, and execution logs. In some aspects, multiple instances of repositories 302 can coexist in an IT infrastructure, for example Development, QA, User, Acceptance, and Production. Repositories 302 are configured to allow several separated environments that exchange metadata and scenarios (for example: Development, Test, Maintenance and Production environments). Repositories 302 further are configured to act as a version control system where objects are archived and assigned a version number.

In this example, repositories 302 is composed of at least one master repository 304 and one or more work repositories 306. Objects developed or configured for use within data integration system 200 may be stored in one of these repository types. In general, master repository 304 stores the following information: security information including users, profiles and rights, topology information including technologies, server definitions, schemas, contexts, languages and so forth, and versioned and archived objects. The one or more work repositories 306 may contain actual developed objects.

Several work repositories may coexist in data integration system 200 (for example, to have separate environments or to match a particular versioning life cycle). The one or more work repositories 306 store information for models, including schema definition, data stores structures and metadata, fields and columns definitions, data quality constraints, cross references, data lineage, and so forth. The one or more work repositories 306 may further store projects, including business rules, packages, procedures, folders, knowledge modules, variables and so forth, and scenario execution, including scenarios, scheduling information and logs. In some aspects, the one or more work repositories 306 may contain only execution information (typically for production purposes), and be designated as an execution repository.

In various embodiments, repositories 302 store one or more ETL projects. An ETL project defines or otherwise specifies one or more data models that model data attributes of data in a source or target. An ETL project further provides for data quality control as well as defining mappings to move and transform data. Data integrity control ensures the overall consistency of the data. Application data is not always valid for the constraints and declarative rules imposed by a particular source or target. For example, orders may be found with no customer, or order lines with no product, and so forth. Data integration system 200 provides a working environment to detect these constraint violations and to store them for recycling or reporting purposes.

In some embodiments of data integration system 200, there are two different types of controls: Static Control and Flow Control. Static Control implies the existence of rules that are used to verify the integrity of application data. Some of these rules (referred to as constraints) may already be implemented in data servers (using primary keys, reference constraints, etc.) Data integration system 200 allows for the definition and checking of additional constraints, without declaring them directly in a source. Flow Control relates to targets of transformation and integration processes that implement their own declarative rules. Flow Control verifies an application's incoming data according to these constraints before loading the data into a target. Flow control procedures are general referred to as mappings.

An ETL project can be automated into a package that can be deployed for execution in a runtime environment. Accordingly, the automation of data integration flows is achieved by sequencing the execution of the different steps (mappings, procedures, and so forth) in a package and by producing a production scenario containing ready-to-use code for each of these steps. A package is typically made up of a sequence of steps organized into an execution diagram. Packages are the main objects used to generate scenarios for production. They represent the data integration workflow and can perform jobs, such as for example: start a reverse-engineering process on a datastore or a model, send an email to an administrator, download a file and unzip it, define the order in which mappings must be executed, and define loops to iterate over execution commands with changing parameters.

A scenario is designed to put a source component (mapping, package, procedure, variable) into production. A scenario results from the generation of code (SQL, shell, and so forth) for this component. Once generated, the code of the source component is frozen and the scenario is stored inside repositories 302, such as one or more of work repositories 306. A scenario can be exported and then imported into different production environments.

In various embodiments, data integration system 200 is organized around repositories 302 in a modular fashion accessed by Java graphical modules and scheduling agents. Graphical modules can be used to design and build one or more integration processes stored in repositories 302. Administrators, Developers and Operators may use a development studio to access repositories 302. Agents can be used to schedule and coordinate a set of integration tasks associated with an integration process stored in work repositories 306. For example, at runtime, an agent deployed on a desktop, web services, or otherwise in communication with a source coordinates the execution of one or more integration processes. The agent may retrieve code stored in work repository 306, connect to various source and target systems using connection information stored in a master repository 304, and orchestrate an overall data integration process or scenario.

In this embodiment, data integration system 200 includes desktop 308 that may include one or more of the above discussed graphical modules and/or agents. Desktop 308 is representative of one or more desktop or workstation computing devices, such as personal computers, laptops, netbooks, tablets, and the like. Desktop 308 includes a Java virtual machine (JVM) 310 and Oracle Data Integrator (ODI) Studio 312. Java virtual machine (JVM) 310 is a virtual machine that can execute Java bytecode. JVM 310 is most often implemented to run on an existing operating system, but can also be implemented to run directly on hardware. JVM 310 provides a run-time environment in which Java bytecode can be executed, enabling features such as runtime web service (WS) 314 and agent 316. JVM 310 may include a Java Class Library, a set of standard class libraries (in Java bytecode) that implement the Java application programming interface (API), and other elements that form a Java Runtime Environment (JRE).

Agent 316 is configured to schedule and coordinate a set of integration tasks associated with one or more integration processes stored in work repositories 306. For example, at runtime, an agent coordinates the execution of integration processes. The agent may retrieve code stored in master repository 304, connect to various source and target systems, and orchestrate an overall data integration process or scenario.

Referring again to FIG. 3, ODI Studio 312 includes hardware and/or software elements configured to design data integration projects. In this example, ODI Studio 312 includes four graphical modules or navigators that are used to create and manage data integration projects, namely, designer module 318, operator module 320, topology module 322, and security module 324. Designer module 318 is a module configured to define data stores (tables, files, Web services, and so on), data mappings, and packages (sets of integration steps, including mappings). In various embodiments, designer module 318 defines declarative rules for data transformation and data integrity. Accordingly, project development takes place in designer module 318. Additionally, in designer module 318, is where database and application metadata are imported and defined. Designer module 318, in one embodiment, uses metadata and rules to generate data integration scenarios or load plans for production. In general, designer module 318 is used to design data integrity checks and to build transformations such as for example: automatic reverse-engineering of existing applications or databases, graphical development and maintenance of transformation and integration mappings, visualization of data flows in the mappings, automatic documentation generation, and customization of generated code.

Operator module 320 is a module configured to view and manage production integration jobs. Operator module 320, thus, manages and monitors data integration processes in production and may show execution logs with error counts, the number of rows processed, execution statistics, the actual code that is executed, and so on. At design time, developers can also use operator module 320 for debugging purposes in connection with designer module 318.

Topology module 322 is a module configured to create and manage connections to datasources and agents. Topology module 322 defines the physical and logical architecture of the infrastructure. Infrastructure or projects administrators may register servers, database schemas and catalogs, and agents in a master repository through topology module 322. Security module 324 is a module configured to manage users and their repository privileges.

In general, a user or process interacts with designer module 318 to create a data integration project having one or more data integration processes for sources and targets 326. Each data integration process includes at least one data integration task. In some embodiments, a data integration tasks is defined by a set of business rules indicative of what bit of data is to be transformed and combined with other bits as well as technical specifics of how the data is actually extracted, loaded, and so on. In preferred embodiments, a data integration tasks is specified using a declarative approach to build data mappings. A mapping is an object that populates one datastore, called the target, which data coming from one or more other datastores, known as sources. In general, columns in the source datastore are linked to the columns in the target datastore through mapping. A mapping can be added into a package as a package step. As discussed above, a package defines a data integration job. A package is created under a project and is made up of an organized sequence of steps, each of which can be a mapping or a procedure. A package can have one entry point and multiple exit points.

In some embodiments, when creating a new mapping, a developer or technical business user interacts with designer 318 to first define which data is integrated and which business rules should be used. For example, the developer may specify what tables are to be joined, filters to be applied, and SQL expressions to be used to transform data. The particular dialect of SQL that is used is determined by the database platform on which the code is to be executed. Then, in a separate step, technical staff can interact with designer 318 to choose the most efficient way to extract, combine, and then integrate this data. For example, the technical staff may use database-specific tools and design techniques such as incremental loads, bulk-loading utilities, slowly changing dimensions, and changed-data capture.

In this embodiment, mappings can be created for sources and targets 326. Sources and targets 326 may include one or more legacy applications 328, one or more files/XML documents 330, one or more applications 332, one or more data warehouses (DW), business intelligence (BI) tools and applications, and enterprise process management (EPM) tools and applications 334, and one or more JVMs 336 (including runtime web service 340 and agent 342).

FIG. 4 is a block diagram of environment 400 having various heterogeneous data sources for which data integration scenarios may be created in various embodiments of the present invention. In this example, environment 400 includes ODI Studio 312 and repositories 302. Repositories 302 contain all of the metadata required to generate integration scenarios 400. A user or process interacts with ODI Studio 312 to create integration scenarios 400 using data integrity controls 402 and declarative rules 404.

Orders application 406 is representative of an application for tracking customer orders. An "Orders Application" data model is created to represent data stored in Orders application 406 as well as any data integrity controls or conditions. For example, the "Orders Application" data model may be based on a Hyper Structured Query Language (HSQL) data server and include five datastores, SRC_CITY, SRC_CUSTOMER, SRC_ORDERS, SRC_ORDER_LINES, SRC_PRODUCT, and SRC_REGION.

Parameter file 408 is representative of a flat file (e.g., ASCII) issued from a production system containing a list of sales representatives and the segmentation of ages into age ranges. In this example, a "Parameter" data model is created to represent the data in the flat file. For example, the "Parameter" data model may be based on a file data server and include two datastores, SRC_SALES_PERSON and SRC_AGE_GROUP.

Sales administration application 410 is representative of an application for tracking sales. The sales administration application 410 may be a data warehouse populated with transformations of data from orders application 406 and parameter file 408. A "Sales Administration" data model is created to represent data stored in sales administration application 410 as well as any data integrity controls or conditions or transformations. For example, the "Sales Administration" data model may be based on a Hyper Structured Query Language (HSQL) data server and include six datastores, TRG_CITY, TRG_COUNTRY, TRG_CUSTOMER, TRG_PRODUCT, TRG_PROD_FAMILY, TRG_REGION, and TRG_SALE.

Figure 5A:
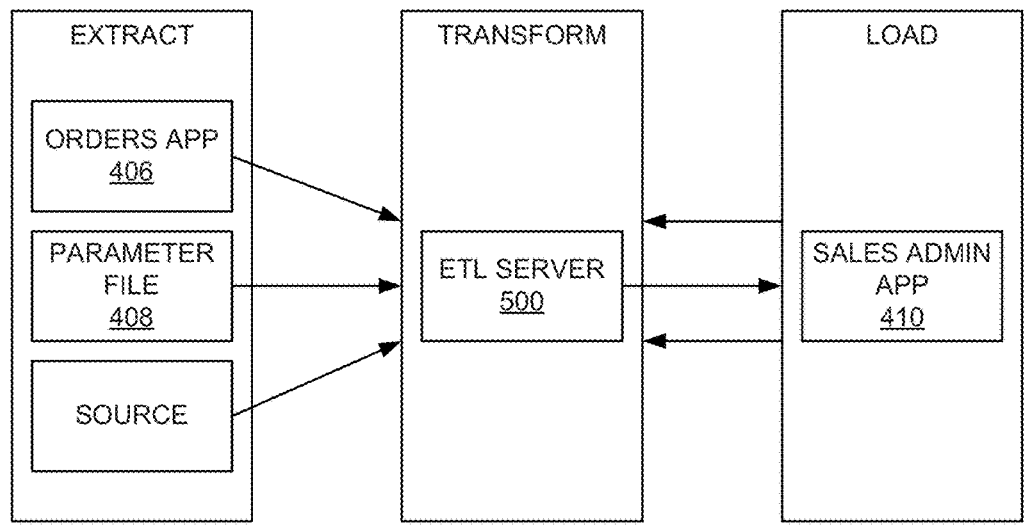
FIGS. 5A and 5B depict simplified data flows in conventional data integration processing that may be performed by the data integration system.
Figure 5B:
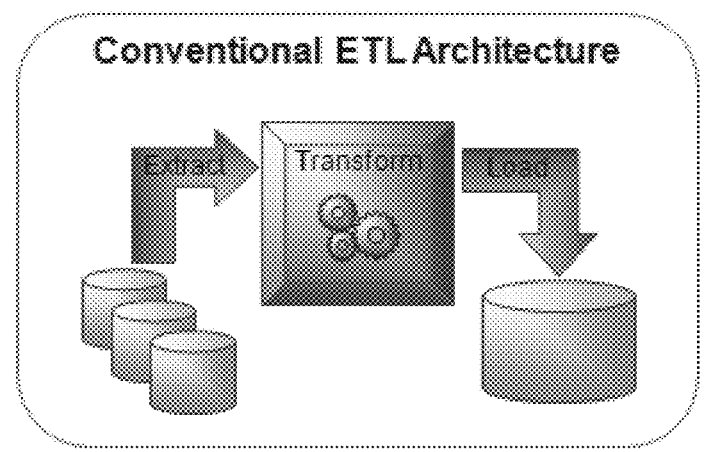

FIGS. 5A and 5B depict simplified data flows in conventional data integration processing that may be performed by data integration system 200. In this example, data from orders application 406, parameter file 408, and one or more other optional or additional sources flow through a traditional ETL process targeted to sales administration application 410. Data transforms occur in a separate ETL server 500. The scenario requires dedicated or proprietary resources, results in poorer performance, and incurs high costs.

Figure 6A:
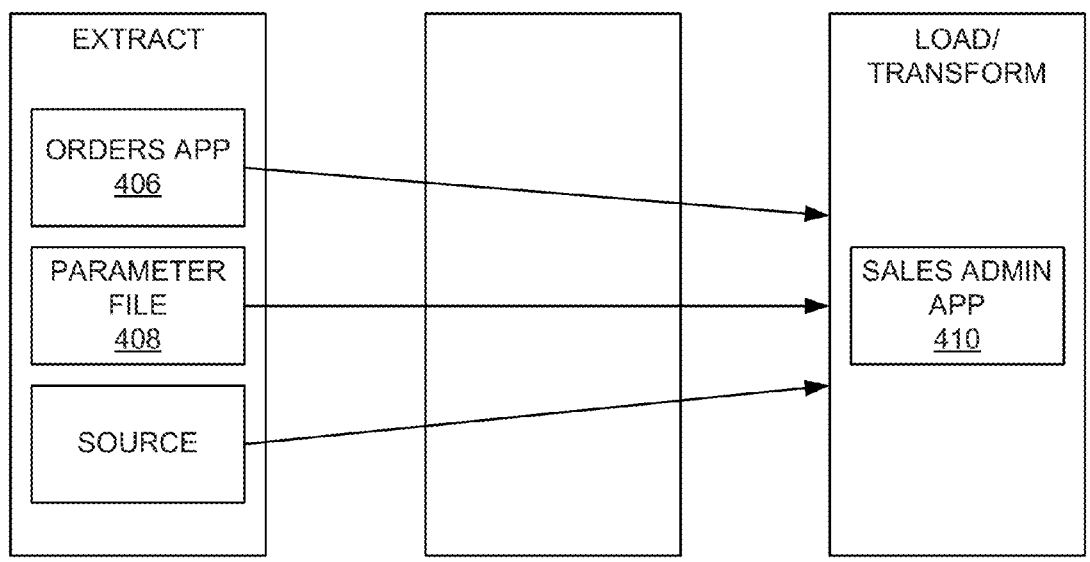
FIGS. 6A and 6B depict simplified data flows in next generation data integration processing that may be performed by the data integration system, in accordance with an embodiment of the present invention.
Figure 6B:
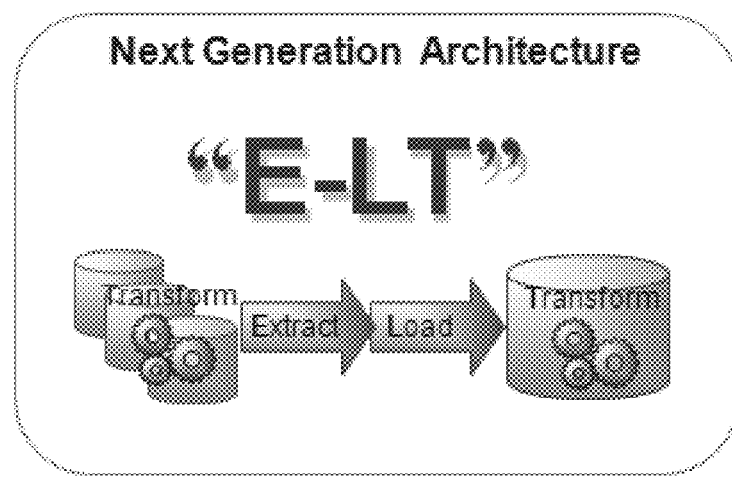

FIGS. 6A and 6B depict simplified data flows in next generation data integration processing that may be performed by data integration system 200, in accordance with an embodiment of the present invention. In this example, data from orders application 406, parameter file 408, and one or more other optional or additional sources flow through E-LT process targeted to sales administration application 410. Data transforms leverage existing resources resulting in higher performance and efficiency. As described above, prior ETL systems required dedicated and/or proprietary infrastructure to perform data transforms. This was done, in part, to accommodate unknown user infrastructures. For example, without knowing what types of databases are being used, prior ETL systems were unable to anticipate what transform operations would be available in a given system. However, this results in under-utilized resources, such as the user's existing databases and servers which are capable of executing the appropriate data transforms without any dedicated and/or proprietary infrastructure.

In accordance with an embodiment, the present invention leverages the user's existing infrastructure by enabling the user to customize a data integration process according to the user's particular needs. For example, when a data integration plan is designed, it can be divided into discrete portions which are executable by a single system, referred to as execution units. Once a data integration plan has been divided into a plurality of execution units, the user can be presented with a physical plan based on the user's infrastructure and system resources. This plan can be further customized by the user to change which user systems execute which execution units. For example, a user may be presented with a plan in which a join operation is executed on a first database, and the user may customize the plan by moving the join operation to a second database.

As shown in FIG. 6B, this results in an extract-load-transform (E-LT) architecture that does not rely on a stand-alone transform server which characterized prior ETL systems. Instead, as described above, data transforms can be performed on the user's existing infrastructure. The E-LT architecture provides users with greater flexibility while reducing costs associated with acquiring and maintaining proprietary transform servers.

Referring again to FIG. 3, agents can be used to schedule and coordinate a set of integration tasks associated with an integration process. For example, at runtime, an agent coordinates the execution of integration processes. The agent may retrieve code stored in a work repository 306, connect to the various source and target systems and orchestrate an overall data integration process or scenario. In various embodiments, there are two types of agents. In one example, a standalone agent is installed on desktop 308, such as agent 316. In another example, an application server agent can be deployed on application server 326 (such as a Java EE Agent deployed on an Oracle WebLogic Server) and can benefit from the application server layer features such as clustering for High Availability requirements. In yet another example, an agent can be deployed on sources and targets 326, such as agent 342.

In this embodiment, data integration system 200 includes application server 344 that may include one or more of the above discussed agents. Application server 344 is representative of one or more application servers, web-servers, or hosted applications. In this example, application server 344 includes FMW console 346, servlet container 348, web services container 350, and data sources connection pool 352.

FMW console 346 is representative of one or more hardware and/or software elements configured to manage aspects of application server 344, such as information related to servlet container 348, web services container 350, and data sources connection pool 334. For example, FMW console 346 may be a browser-based, graphical user interface used to manage an Oracle WebLogic Server domain. FMW console 346 may include functionality to configure, start, and stop WebLogic Server instances, configure WebLogic Server clusters, configure WebLogic Server services, such as database connectivity (JDBC) and messaging (JMS), configure security parameters, including creating and managing users, groups, and roles, configure and deploy Java EE applications, monitor server and application performance, view server and domain log files, view application deployment descriptors, and edit selected run-time application deployment descriptor elements. In some embodiments, FMW console 346 includes ODI plug-in 354 providing FMW console 346 with access to data integration processes in production and may show execution logs with error counts, the number of rows processed, execution statistics, the actual code that is executed, and so forth.

Servlet container 348 is representative of one or more hardware and/or software elements configured to extend the capabilities of application server 344. Servlets are most often used to process or store data that was submitted from an HTML form, provide dynamic content such as the results of a database query, and manage state information that does not exist in the stateless HTTP protocol, such as filling the articles into the shopping cart of the appropriate customer. A servlet is typically a Java class in Java EE that conforms to the Java Servlet API, a protocol by which a Java class may respond to requests. To deploy and run a servlet, servlet container 348 is used as a component of a web server that interacts with servlets. Accordingly, servlet container 348 may extend functionality provided by public web service 356 and data services 358 of web services container 350 as well as access to data pools provided by data sources connection pool 352. Servlet container 348 is also responsible for managing the lifecycle of servlets, mapping a URL to a particular servlet and ensuring that the URL requester has the correct access rights.

In this example, servlet container 348 includes Java EE application 360 associated with ODI SDK 362, ODI console 364, and runtime web service 366 associated with Java EE agent 368. ODI SDK 362 provides a software development kit (SDK) for data integration and ETL design. ODI SDK 362 enables automation of work that is common and very repetitive allowing a user to script repetitive tasks.

ODI console 364 is a Java Enterprise Edition (Java EE) application that provides Web access to repositories 302. ODI console 364 is configured to allow users to browse Design-Time objects, including projects, models, and execution logs. ODI console 364 may allow users to view flow maps, trace the source of all data, and even drill down to the field level to understand the transformations used to build the data. In addition, end users can launch and monitor scenario execution through ODI console 364. In one aspect, ODI console 364 provides administrators with the ability to view and edit Topology objects such as Data Servers, Physical and Logical Schemas as well as to manage repositories 302.

Data Scenario Design and Development

As discussed above, a scenario is designed to put a source component (mapping, package, procedure, variable) into production. A scenario results from the generation of code (SQL, shell, and so forth) for this component. A scenario can be exported and then imported into different production environments.

Figure 7:
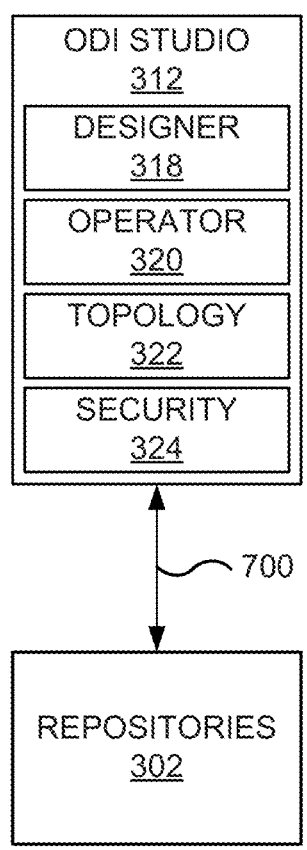
FIG. 7 is a simplified block diagram of interactions between an ODI Studio and a repository of the data integration system in one embodiment according to the present invention.

FIG. 7 is a simplified block diagram of interactions between an ODI Studio and a repository of the data integration system in one embodiment according to the present invention. In the embodiment shown in FIG. 7, ODI Studio 312 of FIG. 3 uses metadata and rules to generate data integration scenarios 700 for production. In general, designer module 318 is used to design data integrity checks and to build transformations such as for example: automatic reverse-engineering of existing applications or databases, graphical development and maintenance of transformation and integration mappings, visualization of data flows in the mappings, automatic documentation generation, and customization of generated code.

Figure 8:
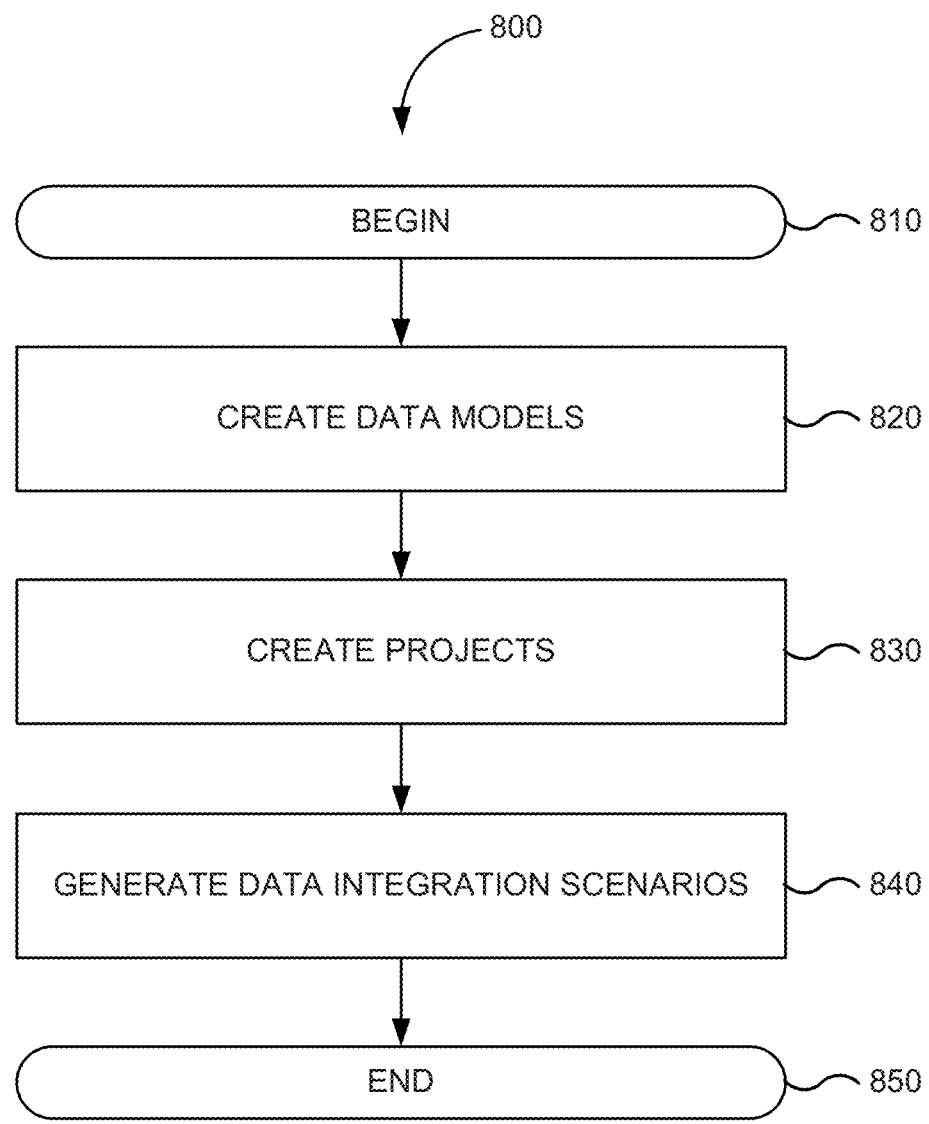
FIG. 8 depicts a flowchart of a method for creating a data integration scenario in accordance with an embodiment of the present invention.

FIG. 8 depicts a flowchart of method 800 for creating a data integration scenario in accordance with an embodiment of the present invention. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In various embodiments, a user may initiate a session with designer module 318 of ODI Studio 312 and connect to repositories 302. The user may interact with one or more user interface features to create a new data integration project or select from existing data integration projects stored in, for example, work repository 306. In general, designer module 318 is used to manage metadata, to design data integrity checks, and to build transformations. In various embodiments, the main objects handled through designer module 318 are models and projects. Data models contain all of the metadata in a data source or target (e.g., tables, columns, constraints, descriptions, cross-references, etc.). Projects contain all of the loading and transformation rules for a source or target (e.g., mappings, procedures, variables, etc.)

Figure 9:
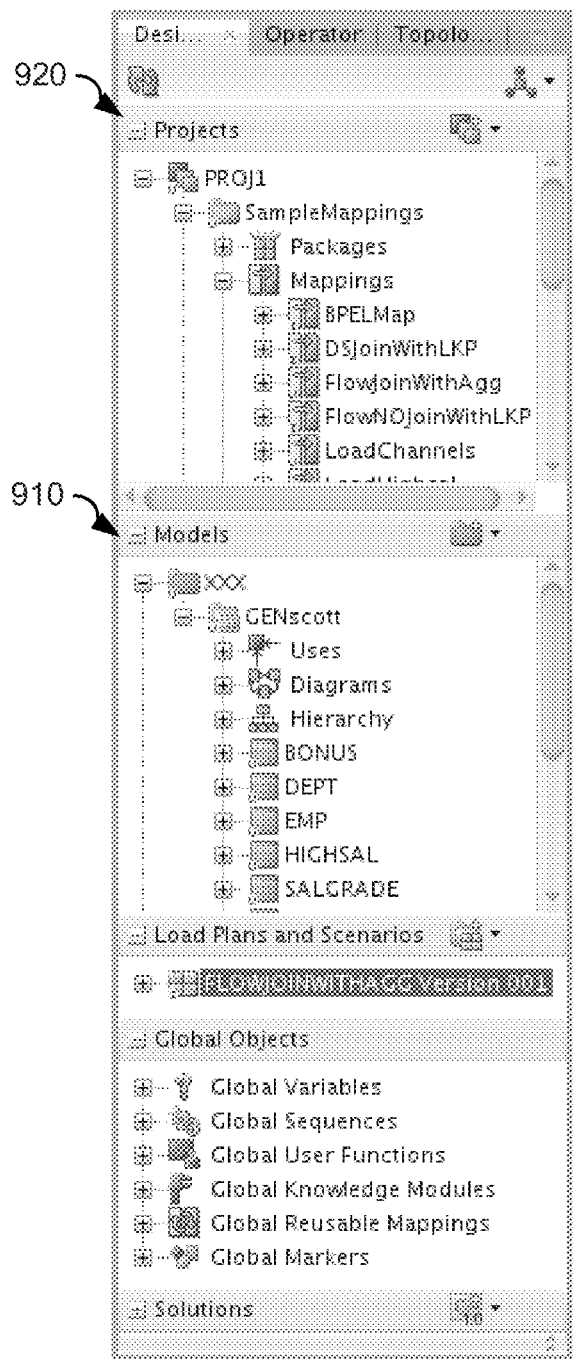
FIG. 9 shows a screenshot of a user interface for creating a data integration scenario in accordance with an embodiment of the present invention.

In step 820, one or more data models are created. In step 830, one or more projects are created. FIG. 9 shows a screenshot of a user interface for creating a data integration scenario in accordance with an embodiment of the present invention. In FIG. 9, navigation panel 910 displays information and includes functionality for interacting with data models. Navigation panel 920 displays information and includes functionality for interacting with projects. As discussed above, the user may not only create the data model, but also develop any data integrity checks for the data in the data models. Additionally, the user may specify mappings, procedures, variables for projects that provide data integrity and transforms for the data in a flow that loads data from a source into a target. FIG. 8 ends in step 850.

Figure 10:
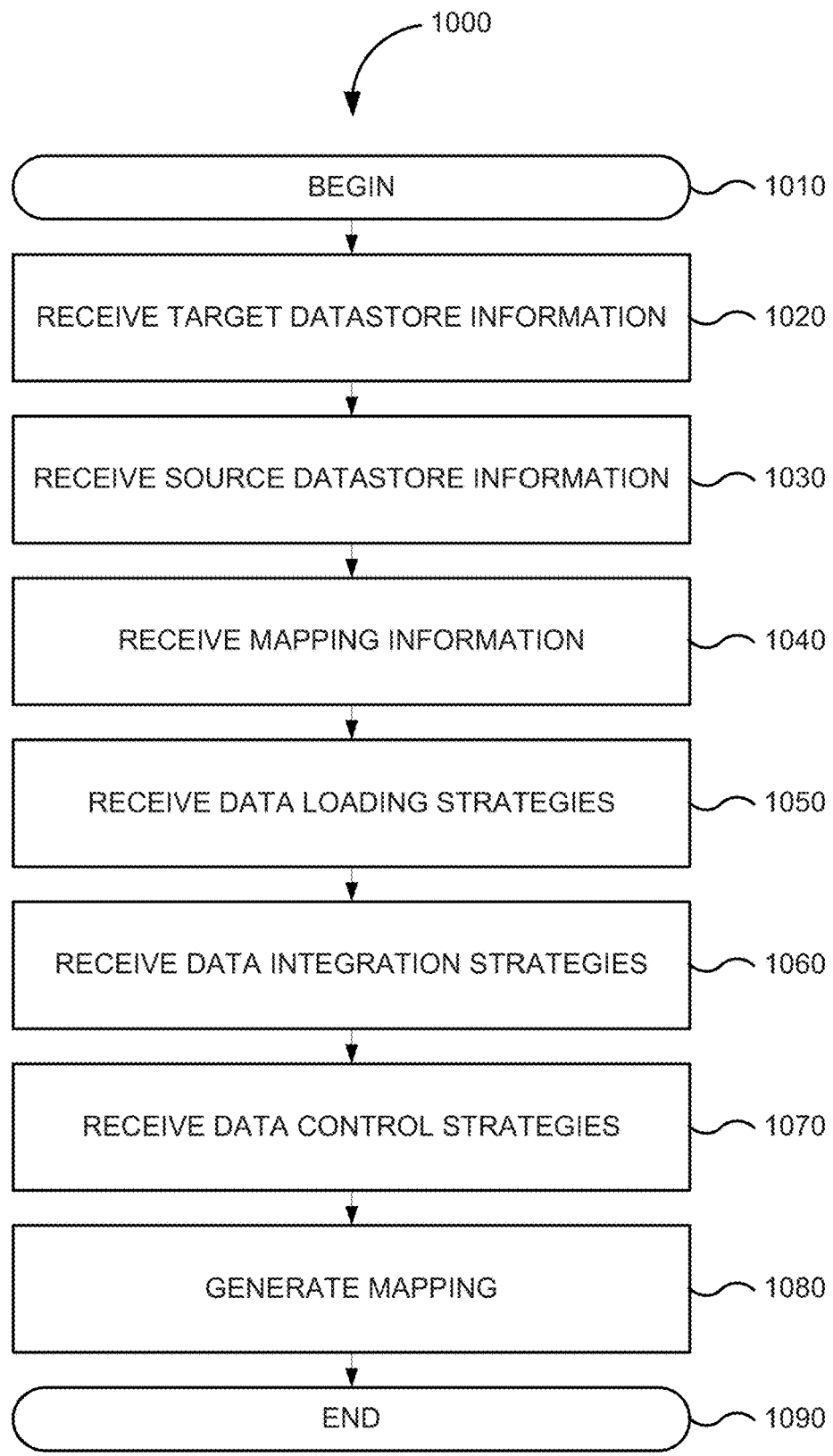
FIG. 10 depicts a flowchart of a method for creating a mapping in accordance with an embodiment of the present invention.

FIG. 10 depicts a flowchart of method 1000 for creating a mapping in accordance with an embodiment of the present invention. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

In step 1020, target datastore information is received. For example, a user may interact with one or more user interface features of designer module 318 to provide target datastore information. In one embodiment, the user may drag and drop target datastore information comprising one or more data models from navigation panel 910 onto a mapping or flow panel that visually represents aspects of a selected data model and any associated transforms or data integrity checks.

In step 1030, source datastore information is received. For example, a user may interact with one or more user interface features of designer module 318 to provide source datastore information. In one embodiment, the user may drag and drop source datastore information comprising one or more data models from navigation panel 910 onto the same mapping or flow panel of the target datastore information that visually represents aspects of a selected data model and any associated transforms or data integrity checks.

In various embodiments, the source datastore information and the target data store information may be composed of one or more data models and optionally operations. Some examples of operations can include one or more data set operations (e.g., unions, joins, intersections, etc.), data transformations, data filter operations, constraints, descriptions, cross-references, integrity checks, or the like. In further embodiments, some of these operations may be preconfigured and visually represented in designer module 318. In other embodiments, custom operations may be provided allowing the user to specify logic, mappings, and the like that implement an operation.

In step 1040, mapping information is received. For example, a user may interact with one or more user interface features of designer module 318 to map the source datastore information to the target datastore information. In one embodiment, the user may visually connect attributes of data elements in the source datastore information with attributes of data elements in the target datastore information. This may be done by matching column names of tables in the source datastore information and the target datastore information. In further embodiments, one or more automatic mapping techniques may be used to provide mapping information.

Figure 11A:
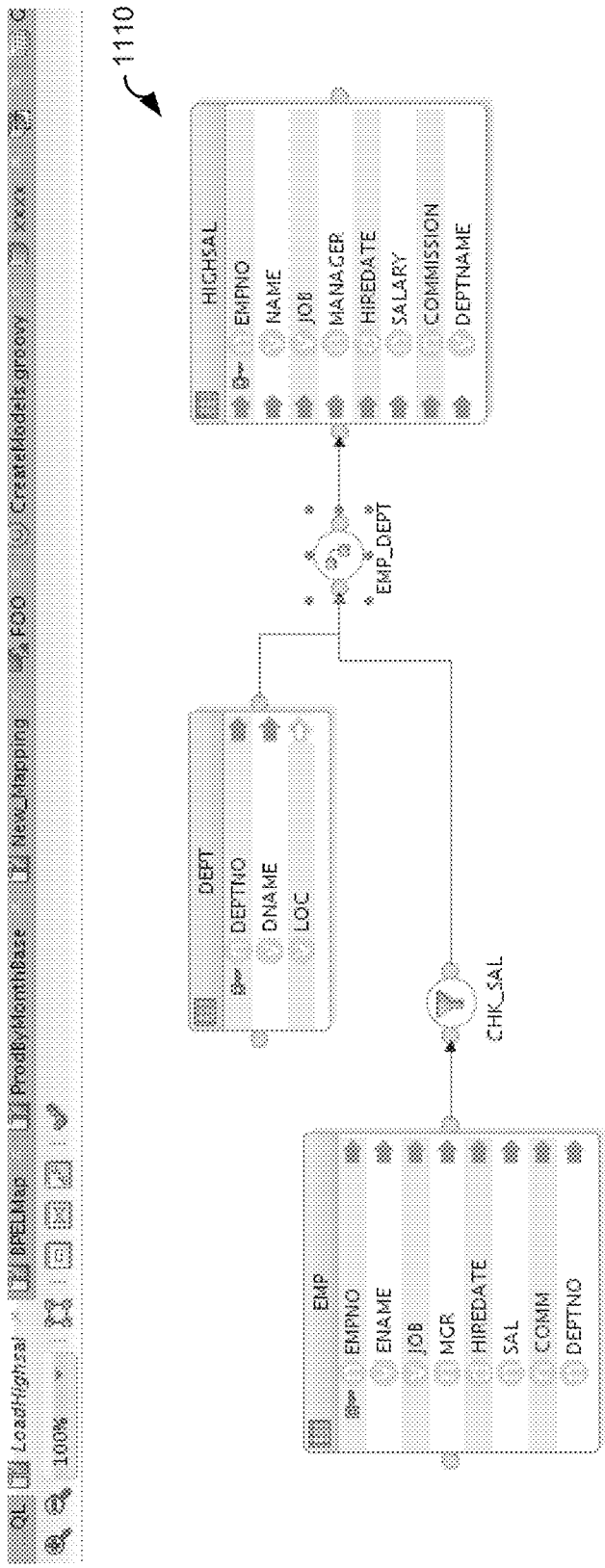
FIGS. 11A and 11B show screenshots of user interfaces for providing mapping information in a data integration scenario in accordance with an embodiment of the present invention.
Figure 11B:
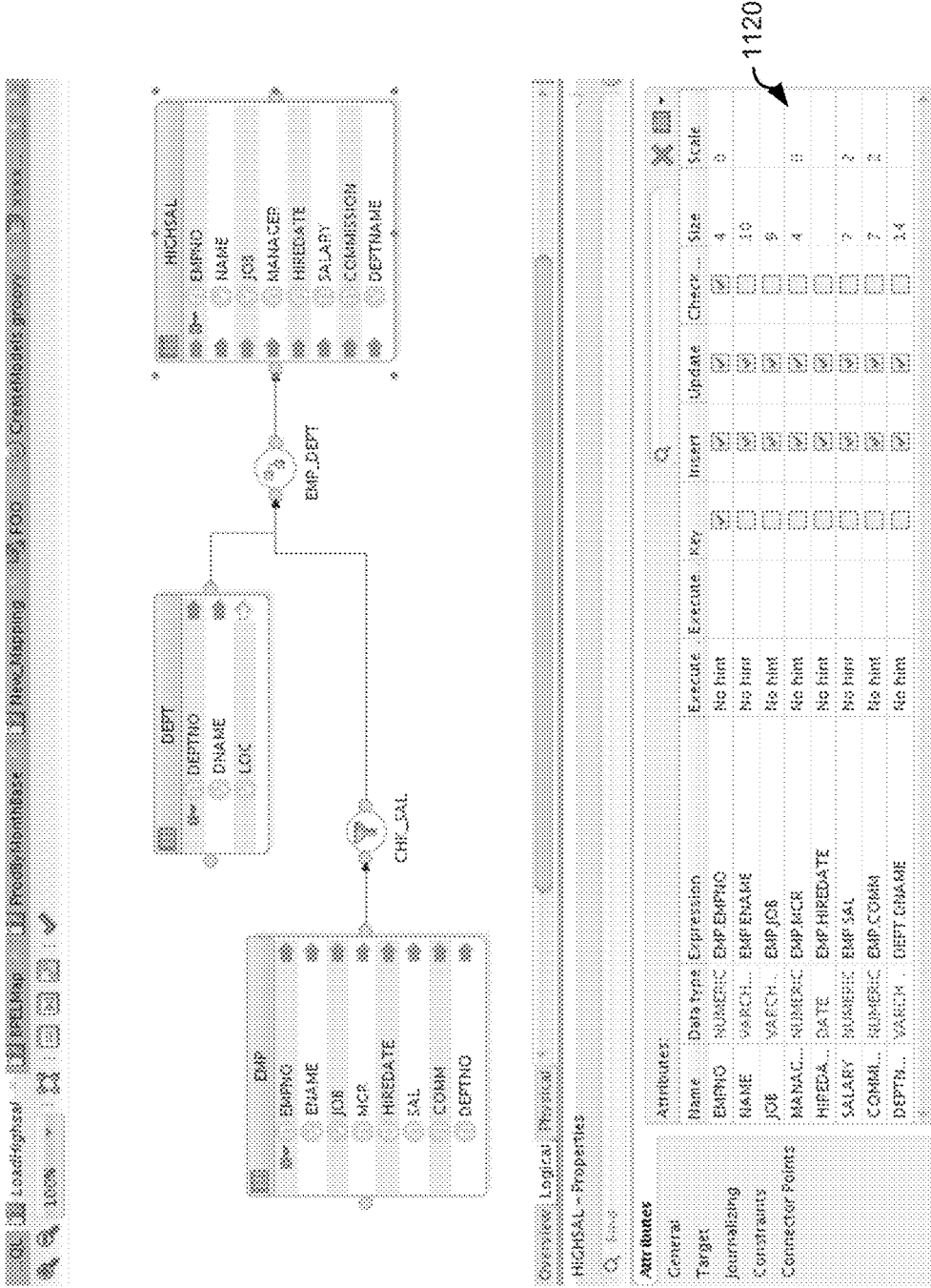

FIGS. 11A and 11B show screenshots of user interfaces for providing mapping information in a data integration scenario in accordance with an embodiment of the present invention. In FIG. 11A, a logical mapping is shown in panel 1110, including both target and source datastores. In FIG. 11B, panel 1120 shows properties for a selected component in the logical mapping. Panel 1120 enables the user to configure properties which can be used to generate a physical design based on the logical mapping.

Referring again to FIG. 10, in step 1050, data loading strategies are received. A data loading strategy includes information on how the actual data from the source datastore information is to be loaded during an extract phase. Data loading strategies can be defined in the physical tab of the mapping editor of designer 318. In some embodiments, a data loading strategy can be automatically computed for a flow depending on a configuration of the mapping.

For example, one or more knowledge modules may be proposed for the physical design. A knowledge module (KM) is a component that implements reusable transformation and ELT (extract, load, and transform) strategies across different technologies. In one aspect, knowledge modules (KMs) are code templates. Each KM can be dedicated to an individual task in an overall data integration process. The code in KMs appears in nearly the form that it will be executed with substitution methods enabling it to be used generically by many different integration jobs. The code that is generated and executed is derived from the declarative rules and metadata defined in the designer module 318. One example of this is extracting data through change data capture from Oracle Database 10g and loading the transformed data into a partitioned fact table in Oracle Database 11g, or creating timestamp-based extracts from a Microsoft SQL Server database and loading this data into a Teradata enterprise data warehouse.

The power of KMs lies in their reusability and flexibility—for example, a loading strategy can be developed for one fact table and then the loading strategy can be applied to all other fact tables. In one aspect, all mappings that use a given KM inherit any changes made to the KM. In some embodiments, five different types of KMs are provided, each of them covering one phase in a transformation process from source to target, such as an integration knowledge module (IKM), a loading knowledge module (LKM), and a check knowledge module CKM.

Referring to FIG. 4, a user may define a way to retrieve the data from SRC_AGE_GROUP, SRC_SALES_PERSON files and from the SRC_CUSTOMER table in environment 400. To define loading strategies, a user may select an access point that corresponds to the loading of the SRC_AGE_GROUP file and select an LKM File to SQL to implement the data loading from a file to relational database. In one aspect, an LKM is in charge of loading source data from a remote server to a staging area.

In step 1060, data integration strategies are received. After defining the loading phase, the user defines a strategy to adopt for the integration of the loaded data into a target. To define the integration strategies, the user may select a target object and select an IKM SQL Incremental Update. An IKM is in charge of writing the final, transformed data to a target. When an IKM is started, it assumes that all loading phases for remote servers have already carried out their tasks, such as having all remote sources loaded by LKMs into a staging area, or the source datastores are on the same data server as the staging area.

In step 1070, data control strategies are received. In general, a CKM is in charge of checking that records of a data set are consistent with defined constraints. A CKM may be used to maintain data integrity and participates in overall data quality initiative. A CKM can be used in 2 ways. First, to check the consistency of existing data. This can be done on any datastore or within mappings. In this case, the data checked is the data currently in the datastore. In a second case, data in the target datastore is checked after it is loaded. In this case, the CKM simulates the constraints of the target datastore on the resulting data flow prior to writing to the target.

Figure 12:
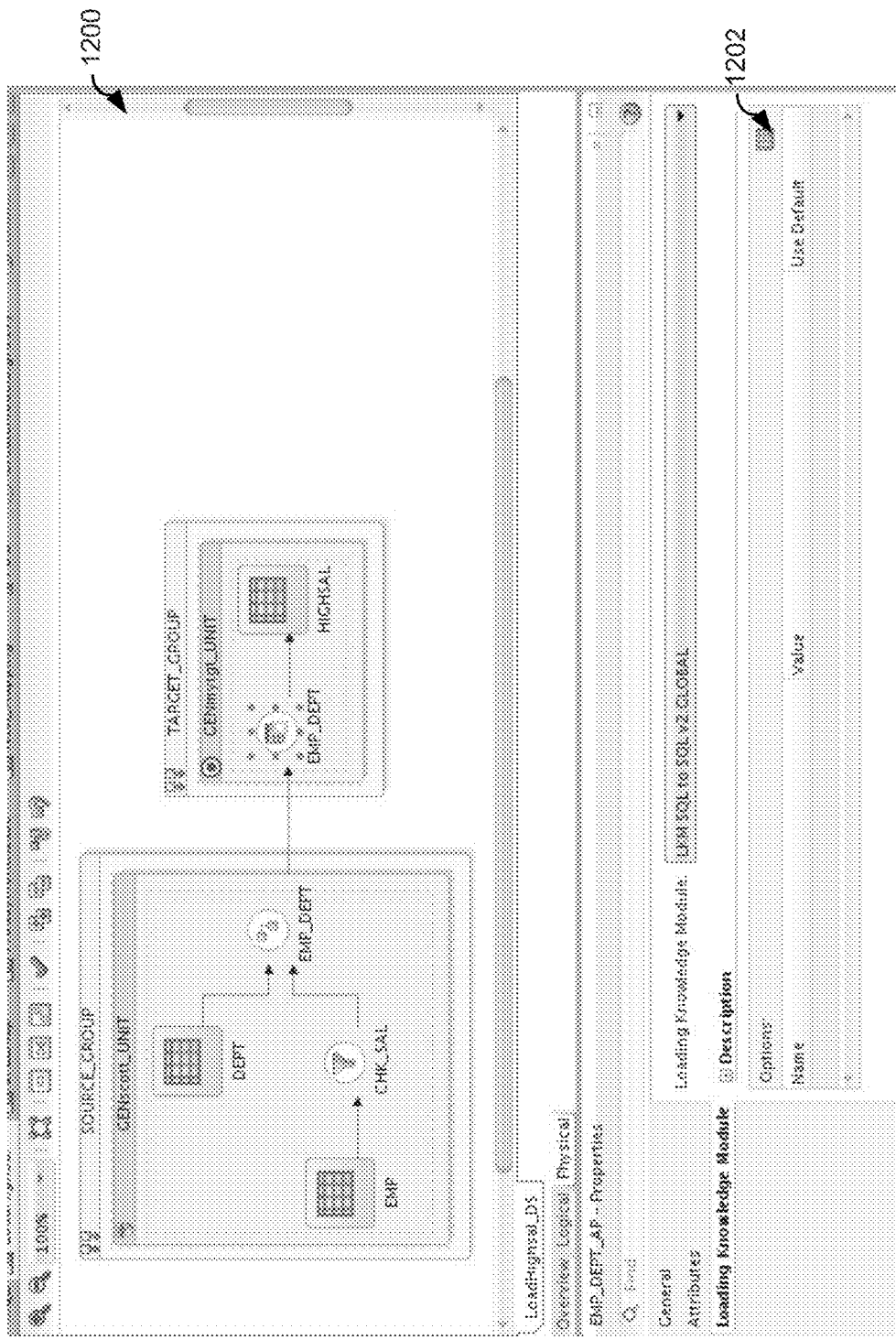
FIG. 12 shows screenshots of user interfaces for providing flow information in a data integration scenario in accordance with an embodiment of the present invention.

FIG. 12 shows screenshots of a user interface for providing flow information in a data integration scenario in accordance with an embodiment of the present invention. In FIG. 12, a physical design of a mapping is shown in panel 1200. At 1202, knowledge modules associated with a selected component in the physical design are shown. Each knowledge module can include one or more configurable options depending on the technology and language associated with that knowledge module. This enables users to take advantage of functionality that is not shared across different technologies/languages, but is instead specific to a particular technology/language.

In step 1080, a mapping is generated. FIG. 10 ends in step 1090.

Data Integration Scenario Packages and Deployment

As discussed above, automation of data integration flows can be achieved in data integration system 200 by sequencing the execution of the different steps (mappings, procedures, and so forth) in a package and by producing a production scenario containing the ready-to-use code for each of these steps. A package is made up of a sequence of steps organized into an execution diagram. Packages are the main objects used to generate scenarios for production. A scenario is designed to put a source component (mapping, package, procedure, variable) into production. A scenario results from the generation of code (SQL, shell, and so forth) for this component. A scenario can be exported and then imported into different production environments.

Figure 13:
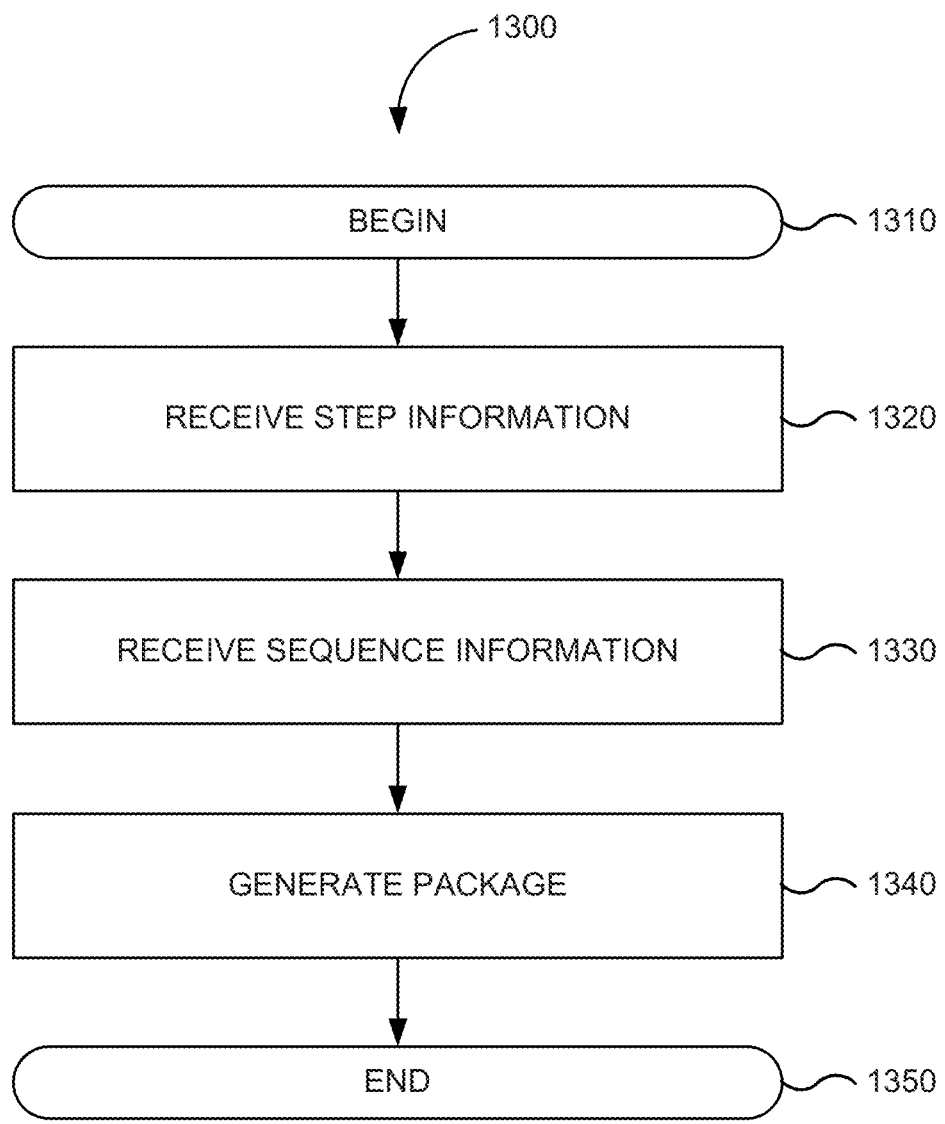
FIG. 13 depicts a flowchart of a method for creating a package in accordance with an embodiment of the present invention.

FIG. 13 depicts a flowchart of a method for creating a package in accordance with an embodiment of the present invention. Implementations of or processing in method 1300 depicted in FIG. 13 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1300 depicted in FIG. 13 begins in step 1310.

In step 1320, step information is received. Package step information includes information identifying a step, elements, properties, components, and the like. In one example, a user may interact with one or more user interface features of designer module 318 to create, identify, or otherwise specify one or more steps for a package. In one embodiment, one or more components are selected and placed on a diagram. These components appear as steps in the package.

In step 1330, step sequence information is received. Package step sequence information includes information identifying an ordering for a step, dependencies, and the like. Once steps are created, the steps are ordered or reorder into a data processing chain. In one example, a user may interact with one or more user interface features of designer module 318 to provide sequencing or ordering for one or more steps of a package. A data processing chain may include a unique step defined as a first step. Generally, each step has one or more termination states, such as success or failure. A step in some states, such as failure or success, can be followed by another step or by the end of the package. In one aspect, in case of some states, such as failure, sequence information may define a number of retries. In another aspect, a package may have but several possible termination steps.

In step 1340, a package is generated. FIG. 13 ends in step 1350.

Figure 14:
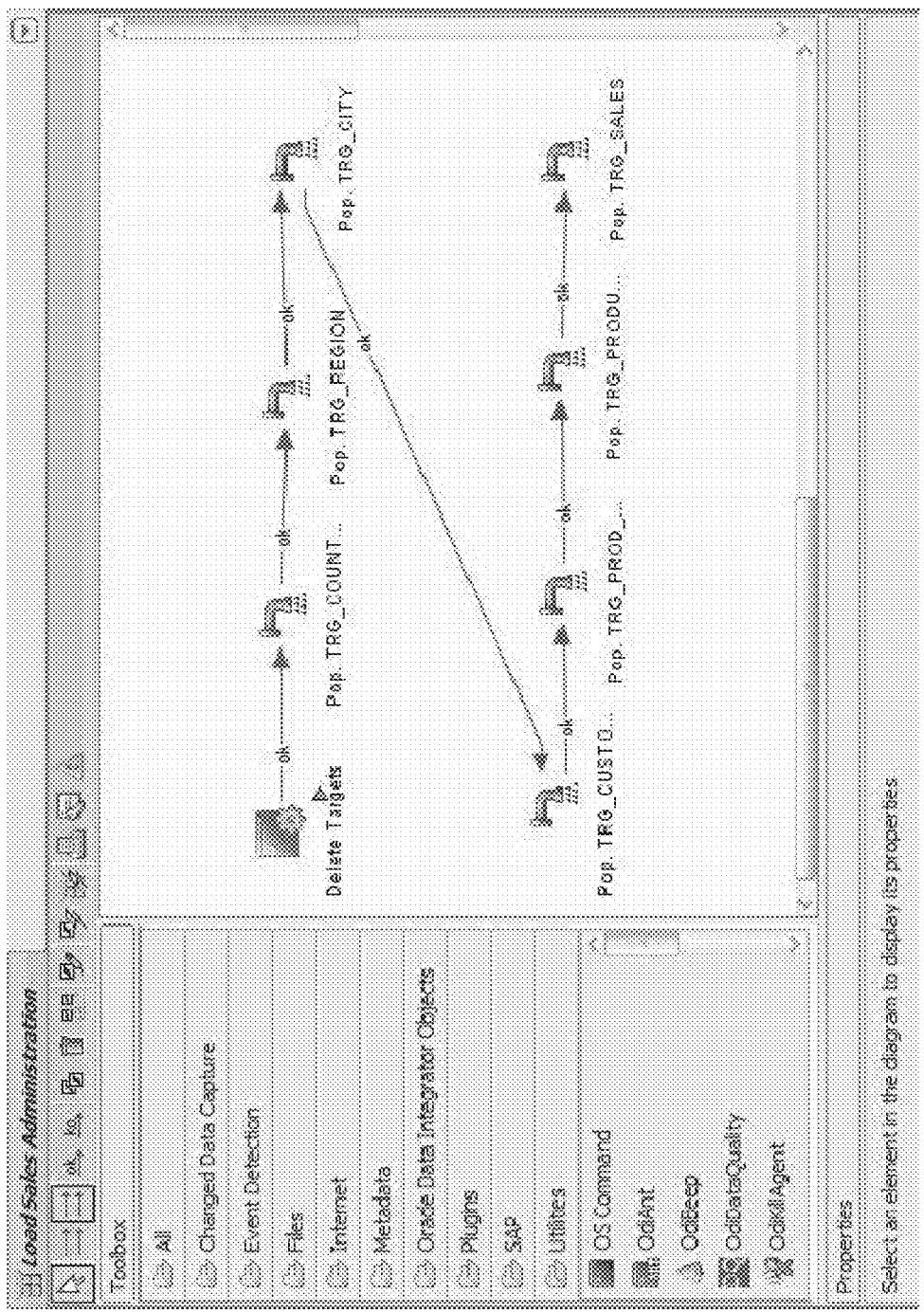
FIG. 14 is a screenshot of a user interface for providing package sequence information in a data integration scenario in accordance with an embodiment of the present invention.

FIG. 14 is a screenshot of a user interface for providing package sequence information in a data integration scenario in accordance with an embodiment of the present invention.

As discussed above, the automation of data integration flows can be achieved by sequencing the execution of different steps (mappings, procedures, and so forth) in a package. The package can then be produced for a production scenario containing the ready-to-use code for each of the package's steps. In various embodiments, the package is deployed to run automatically in a production environment.

Figure 15:
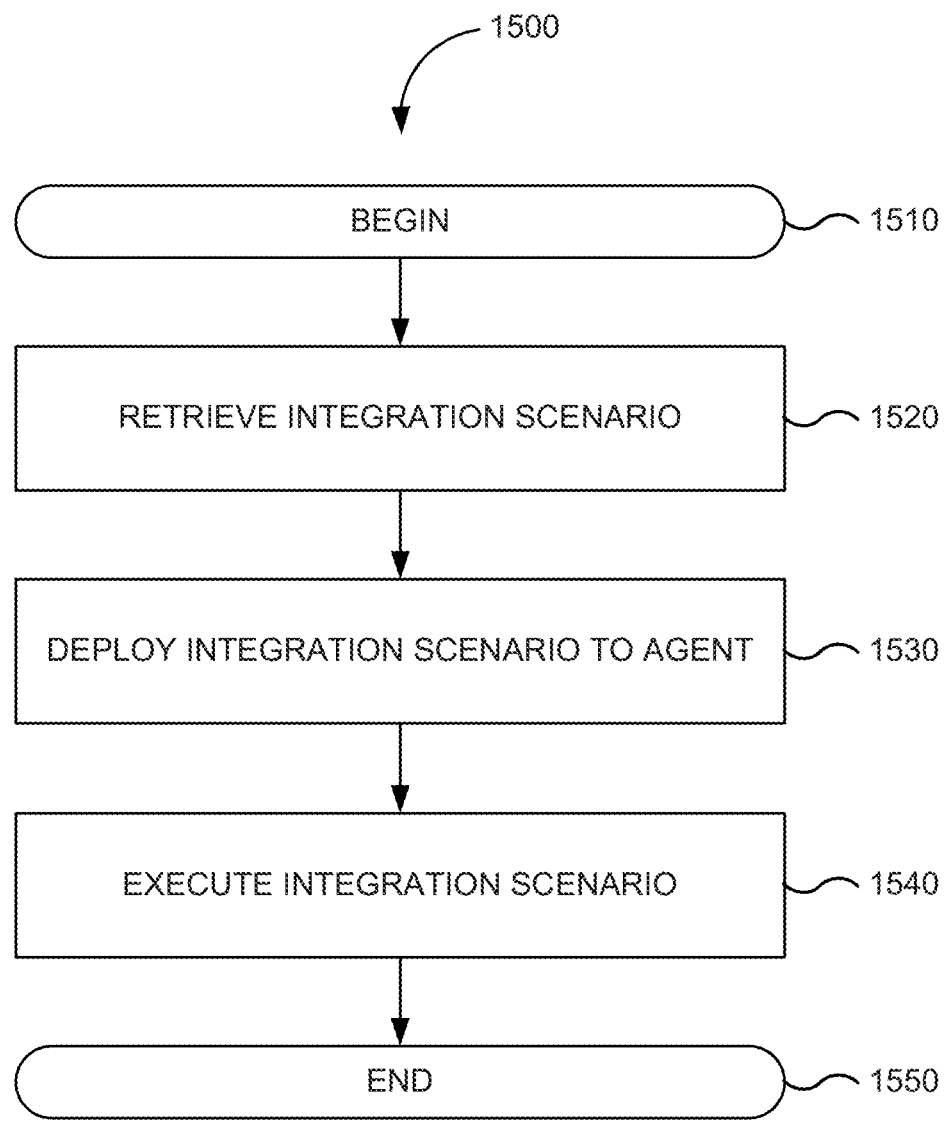
FIG. 15 depicts a flowchart of a method for deploying a data integration scenario in accordance with an embodiment of the present invention.

FIG. 15 depicts a flowchart of method 1500 for deploying a data integration scenario in accordance with an embodiment of the present invention. Implementations of or processing in method 1500 depicted in FIG. 15 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1500 depicted in FIG. 15 begins in step 1510.

In step 1520, an integration scenario is retrieved. In one embodiment, a package is retrieved from repositories 302. In step 1530, the integration scenario is deployed to one or more agents. In step 1540, the integration scenario is executed by the one or more agents. In one aspect, the integration scenario can be executed in several ways, such as from ODI Studio 312, from a command line, or from a web service. Scenario execution can be viewed and monitored, for example, via operator module 320 and the like as discussed above. FIG. 15 ends in step 1550.

Generating Logical and Physical Designs Using Execution Units

Figure 16:
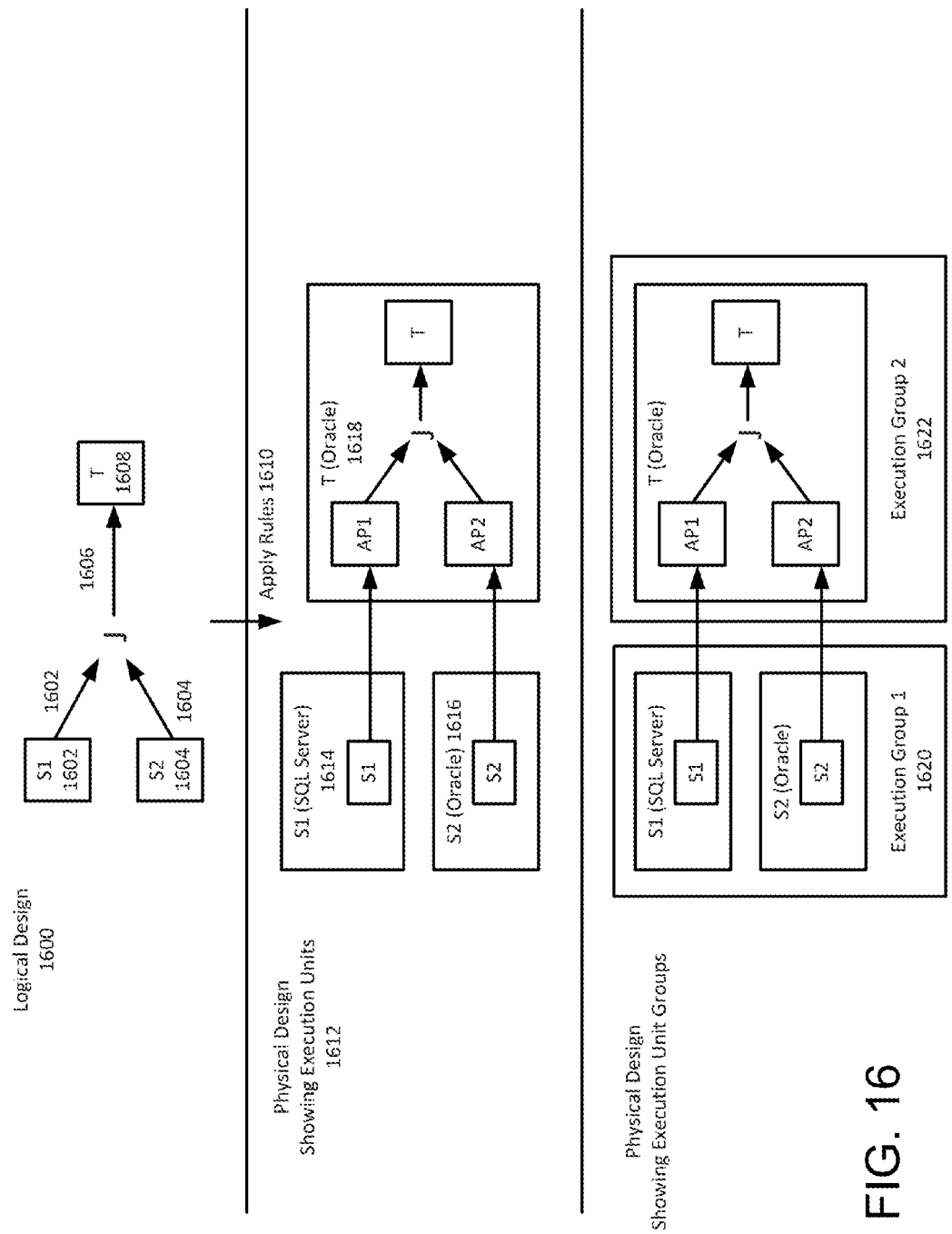
FIG. 16 shows a diagram of a logical design of a data integration mapping and corresponding physical designs, in accordance with an embodiment of the present invention.

As described above, in various embodiments, a data integration system enables users to create a logical design that defines, at a high level, how a user wants data to flow between sources and targets. FIG. 16 shows a diagram of a logical design of a data integration mapping and corresponding physical designs, in accordance with an embodiment of the present invention. As shown in FIG. 16, a simple logical design of a data integration mapping 1600 can represent combining data from two source datastores into a target datastore. In the logical design shown in FIG. 16, data from two source datastores, S1 1602 and S2 1604, are joined, J 1606, and loaded to target datastore T 1608.

Figure 17:
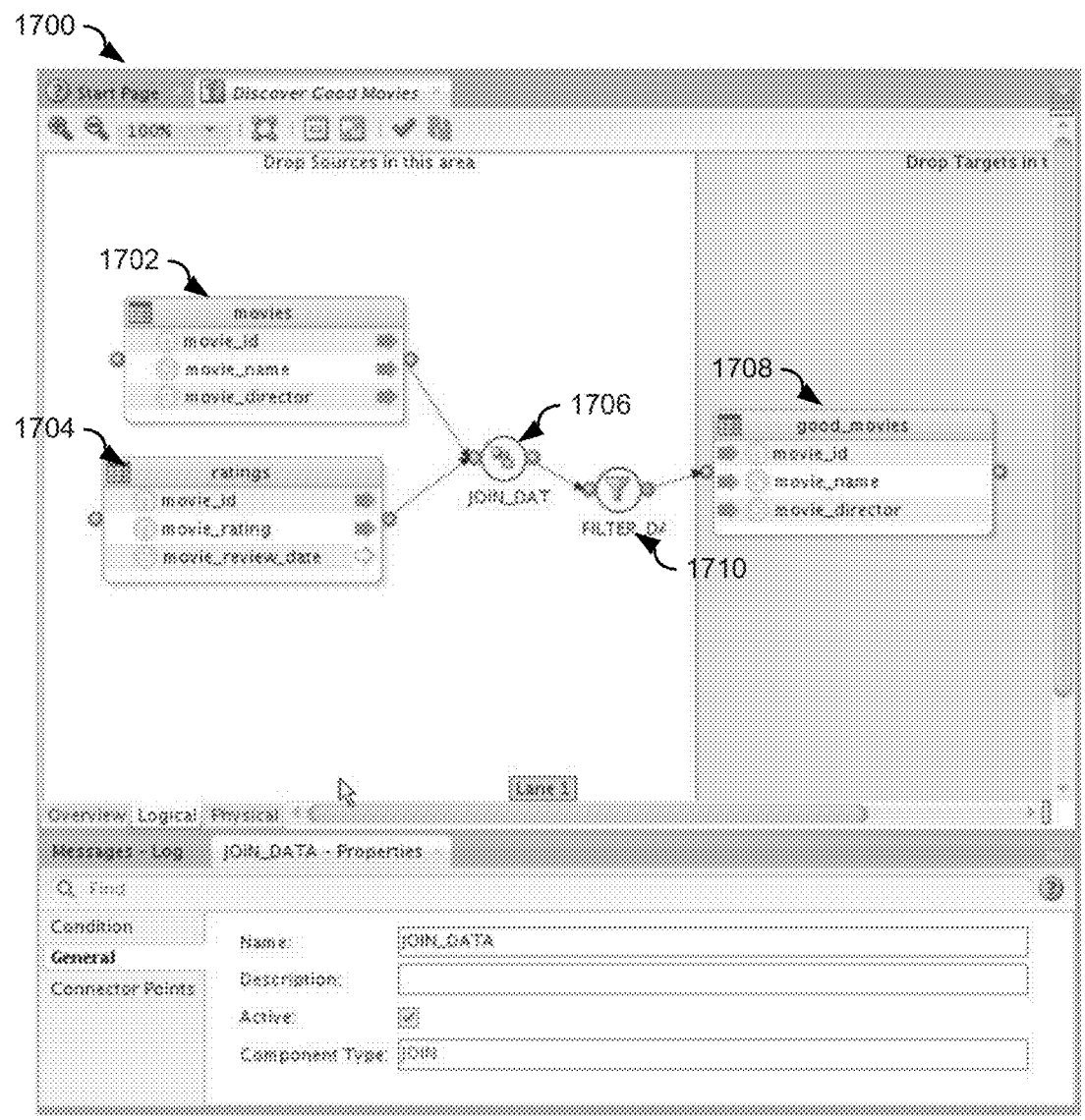
FIG. 17 illustrates a graphical user interface through which data integration mappings can be designed, in accordance with an embodiment of the present invention.

The logical design can be created using a graphical design tool, such as ODI Studio 312. FIG. 17 illustrates a graphical user interface through which data integration mappings can be designed, in accordance with an embodiment of the present invention. As shown in FIG. 17, a data integration mapping can be designed to combine data from any number of source datastores and load the combined data to any number of target datastores. In the example shown in FIG. 17, a user can define a data integration mapping graphically using a graphical user interface (GUI) 1700. The logical design is hardware and language independent, and broadly represents what actions the user wants to perform on the datastores. The mapping shown in FIG. 17 is titled Discover Good Movies. This mapping includes two source datastores: a first source datastore 1702 which is titled "Movies" and which includes data about various movies; and a second source datastore 1704 which is titled "Ratings" and which includes ratings for various movies. A join component 1706 can be used to combine data from each source datastore, which can be loaded to target datastore 1708 titled "Good Movies". A filter component 1710 can be applied to the extracted data such that the movie data that is loaded to the target datastore 1706 corresponds to "good" movies.

Figure 18:
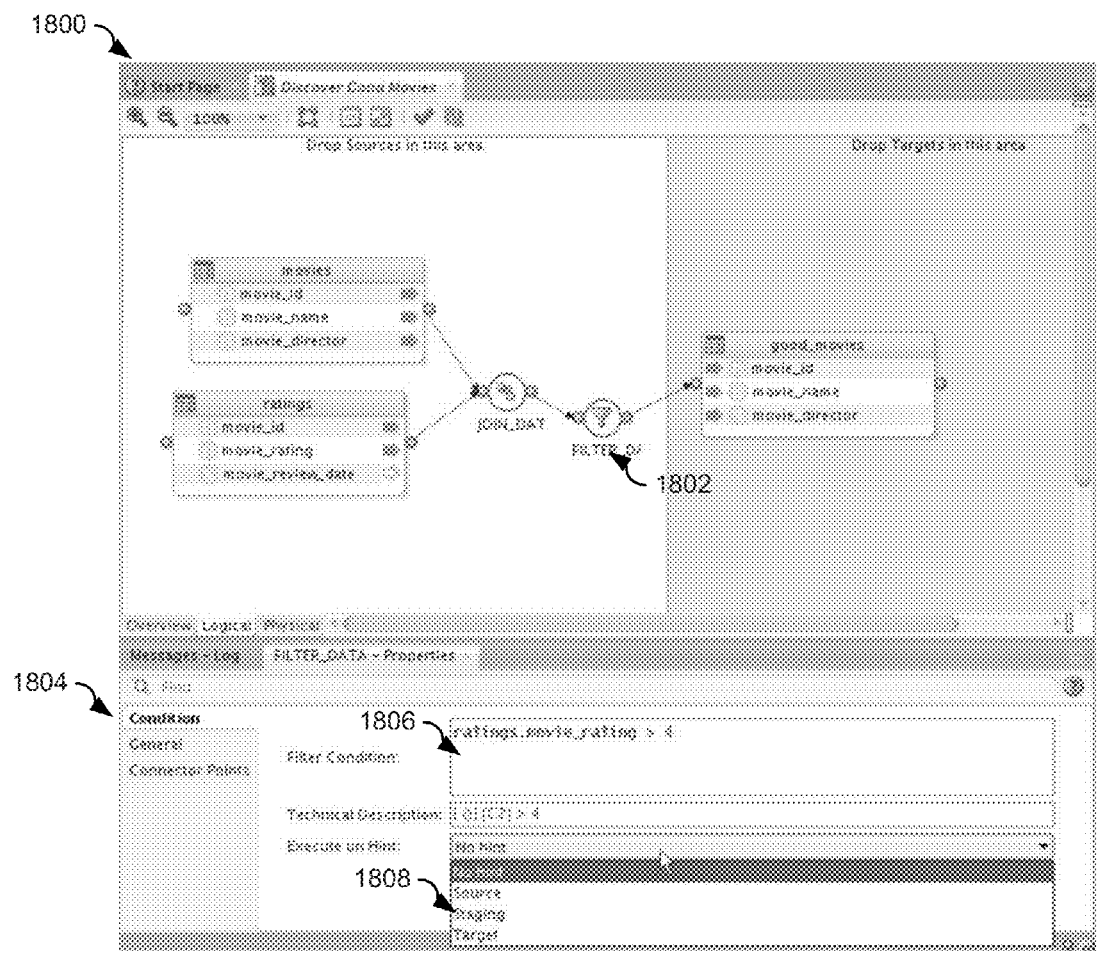
FIG. 18 illustrates a graphical user interface through which a data integration mapping can be configured, in accordance with an embodiment of the present invention.

FIG. 18 illustrates a graphical user interface through which a data integration mapping can be configured, in accordance with an embodiment of the present invention. Each component of the logical design shown in the GUI 1800 can be selected. In the example shown in FIG. 18, the filter component 1802 has been selected. When a component is selected, details about that component can be displayed in a properties area 1804, such as a window or tab, of the GUI 1800. The properties area 1804 enables the user to configure properties which can be used to generate a physical design based on the logical design. For example, the properties for the filter component 1802 enables the user to define the filter condition 1806 and to specify a preference 1808 for where the component executes. In accordance with an embodiment, execution preferences may be referred to as "hints". These hints can be used by the data integration system 200 when creating the physical design from the logical design. For example, as shown in FIG. 18, the user can specify a preference for executing the filter on the source, target, or a staging area.

Returning to FIG. 16, the data integration system 200 can apply one or more rules 1610 to the logical design to generate a physical design 1612 which includes a plurality of execution units. The one or more rules can be based on the user's implementation environment as well as the user's preferences, such as the execution hints described with respect to FIG. 18. As shown in FIG. 16, the physical design 1612 is specific to the user's implementation environment. As such, each execution unit reflects the user's IT infrastructure and can include one or more components. For example, the S1 execution unit 1614 may be an SQL server, while the execution units corresponding to S2 1616 and T 1618 may be Oracle servers. Additionally, the target execution unit 1618 includes components corresponding to the join operation and access points AP1 and AP2. Although specific server technologies are shown in the example of FIG. 16, other underlying technologies, such as Hadoop, may also be used with embodiments of the invention.

As described above, the rules can be based on the user's implementation environment and/or on the user's preferences. Such rules can include a rule that prevents operations from being reordered where such reordering will change the data that will be loaded to the target tables. This ensures that the data result is not different when comparing the physical design with the logical design provided by user. For example, some joins may be prevented from being reordered where it would change the data being loaded in the physical design from that specified in the logical design. Another rule can apply execution hints specified by the user (as described with respect to FIG. 18), as long as application of the execution hints does not violate any other rules. In some embodiments, rules can be assigned a rank by the user, or automatically by the system, that can be used to resolve conflicting rules. Where application of multiple rules conflict, the rule with the higher rank can be applied. In some embodiments, rules can be used to improve performance characteristics of the physical design. For example, a rule can be defined to initially place components into source execution units by default, for example to improve query performance at database level. Another rule can create parallel execution units where there are no dependencies between execution units. This improves execution performance on the top of database.

Each execution unit represents an executable portion of a complex data flow that can be performed on an individual system. Thus, by breaking the complex data flow into individual execution units, the capabilities of the underlying infrastructure can be used to transform data. This eliminates the need for a dedicated ETL server, used by traditional data integration systems. Execution units can be organized in a directed graph that indicates execution dependency between execution units. Execution units which do not depend on each other can also be grouped into execution unit groups, which allows the execution units in a given execution unit group to be executed in parallel. Each execution unit group, can then be executed serially based on the dependency in the execution unit graph. For example, in FIG. 16 the S1 and S2 execution units 1614 and 1616 are independent, and can therefore be grouped into execution unit group 1 1620. The target execution unit 1618 is not independent of any other execution units and is therefore the only member of its execution unit group, execution unit group 2 1622. Each execution unit group can then be executed serially.

Figure 19:
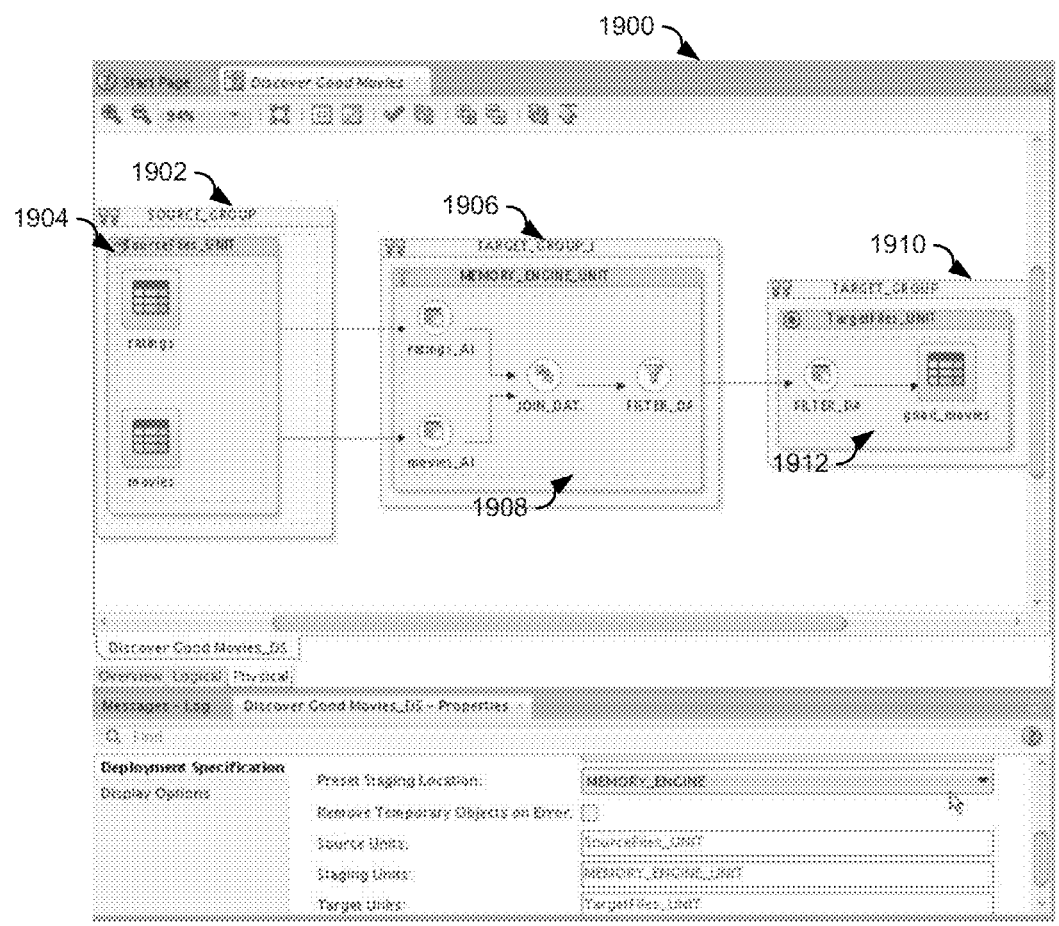
FIG. 19 illustrates a physical design of a data integration mapping based on a logical design, in accordance with an embodiment of the present invention.

FIG. 19 illustrates a physical design of a data integration mapping based on a logical design, in accordance with an embodiment of the present invention. As shown in FIG. 19, the logical design described above with respect to FIGS. 17 and 18 has been analyzed by the data integration system 200 and, in view of the user's preferences, a default physical design 1900 has been generated. The default physical design 1900 includes three execution units, organized into three execution unit groups. The source execution unit group 1902 includes a source files execution unit 1904 which includes components corresponding to each datasource. A first target execution unit group 1906 includes an in-memory execution unit 1908. The in-memory execution unit 1908 includes transform components which are executed in-memory including the join and filter components. The second target execution unit group 1910 includes a target execution unit 1912 and target datastore component. Each component in the default physical design can be customized by the user and alternative physical designs based on user input can be generated, as is described below.

Figure 20:
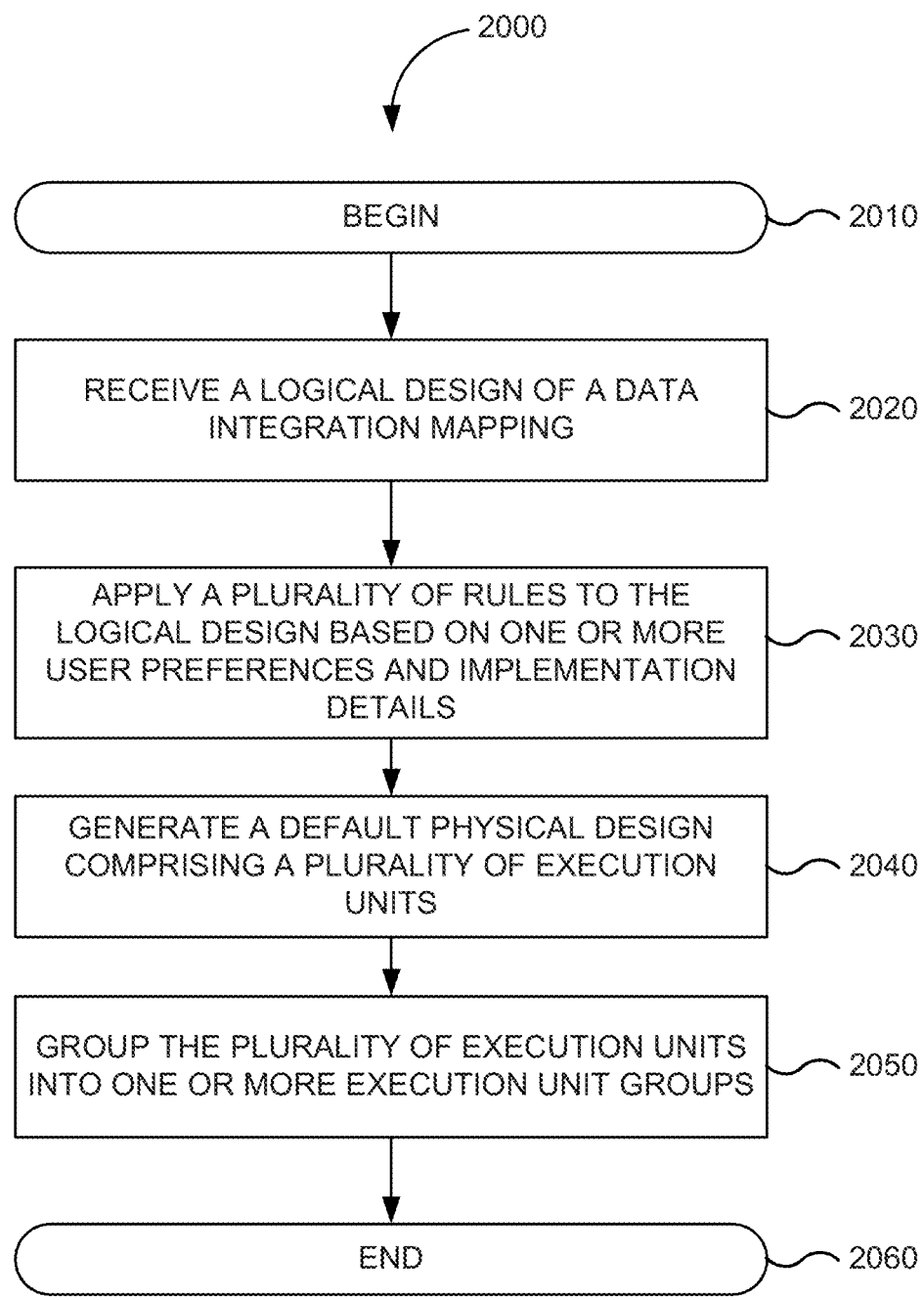
FIG. 20 depicts a flowchart of a method of generating a default physical design based on a logical design of a data integration mapping, in accordance with an embodiment of the present invention.

FIG. 20 depicts a flowchart of a method of generating a default physical design based on a logical design of a data integration mapping, in accordance with an embodiment of the present invention. Implementations of, or processing in, method 2000 depicted in FIG. 20 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 2000 depicted in FIG. 20 begins in step 2010.

In step 2020, a logical design of a data integration mapping is received. In accordance with an embodiment, the logical design can be created by a user in a development environment integrated with the data integration system, such as ODI Studio provided by Oracle International Corporation. Additionally, or alternatively, a logical design may be imported or otherwise obtained from an external datastore and/or design application. In step 2030, a plurality of rules are applied to the logical design based on one or more user preferences and implementation details. Application of the rules can include but is not limited to: pushing transformation operations, such as joins and filters, to the source execution units if possible; where transformation operations that are not allowed by a certain technology, such as a filter in file technology, pushing the transformation operations to other execution units that can handle those operations; where transformation operations that cannot be reordered, such as reordering between filter and outer join, the operations can be validated; affecting the placement of operations based on execution hints in the corresponding execution unit, and other resulting effects of the rules. As described above, the user preferences can include one or more execution hints incorporated into the logical design during creation of the logical design. The implementation details can be provided by the user or automatically detected by the data integration system based on the resources available in a target implementation environment. At step 2040, a default physical design is generated. The default physical design comprises a plurality of execution units, each representing a separately realizable and executable portion of the physical design. At step 2050, the plurality of execution units are grouped into one or more execution unit groups. The grouping can be based on relationships between the plurality of execution units. For example, execution units which do not depend on one another, e.g. independent execution units, can be grouped into an execution unit group. Execution units within a given execution unit group can be executed in parallel, and each execution unit group in the default physical plan can be executed serially, to effect the designed data integration mapping at runtime. FIG. 20 ends in step 2060.

Figure 21:
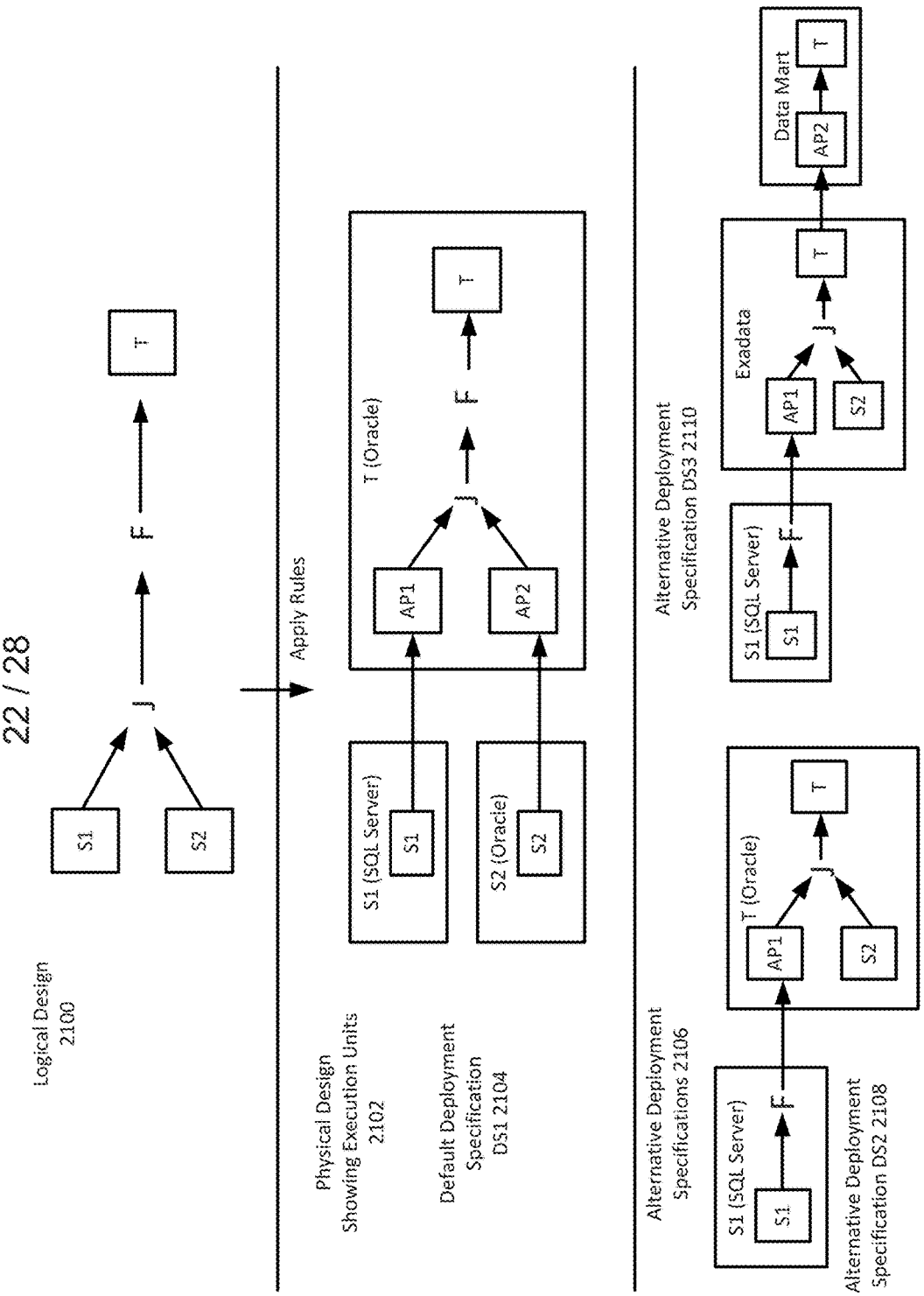
FIG. 21 illustrates the creation of alternative physical designs based on a logical design of a data integration mapping, in accordance with an embodiment of the present invention.

FIG. 21 illustrates the creation of alternative physical designs based on a logical design of a data integration mapping, in accordance with an embodiment of the present invention. In the example shown in FIG. 21, the logical design joins data from two datastores, filters the joined data, and loads the result to the target datastore. As shown in FIG. 21, and as described above with respect to FIG. 16, a logical design 2100 can be analyzed by the data integration system to generate a physical design 2102 comprising a plurality of execution units. In accordance with an embodiment, the physical design 2102 can be referred to as a default deployment specification 2104, that is it represents the default plan which can be deployed to a user's implementation environment. In accordance with an embodiment, the user can generate a plurality of alternative deployment specifications, as shown at 2106. For example, the alternative deployment specifications may correspond to different user preferences. Alternative deployment specification DS2 2108 illustrates a physical design in which the filter component is executed on SQL server S1 and the remaining operations combined to target Oracle server T. In some embodiments, the sequence of components in the physical design can be different from that given in the logical design. For example, a filter component is reordered with the join component.

Similarly, alternative physical designs can be generated for different implementation environments, such as alternative deployment specification DS3 2110. In this example, S1 remains an SQL server, which also executes the filter component, while S2 is an Exadata server, which also executes the join component. The resultant data is then loaded to a target Data Mart server. Each deployment specification is associated with the original logical design and effects the design goals of the logical design. Additionally, as the user's underlying IT infrastructure, available resources, or execution preferences change, additional deployment specifications can be generated to reflect those updated circumstances. This greatly reduces the costs to users of implementing design changes to adapt to changing circumstances by eliminating the need to create new designs from the ground up to accommodate changes to their IT infrastructure. This in turn reduces the costs of upgrading their infrastructure to take advantage of improved systems, knowing that the changes will not break their current designs or lead to extended down times and unforeseen redesign challenges.

FIG. 22 illustrates a user interface for dynamically creating alternative physical designs of a data integration mapping, in accordance with an embodiment of the present invention. As shown in FIG. 22, after analyzing a logical design of a data integration mapping, the user can be presented with a default deployment specification 2200. As described above, the default deployment specification represents a default physical design corresponding to the logical design which is generated based on user preferences and the user's target implementation environment. The default deployment specification can include a plurality of execution units organized into one or more execution unit groups. Once generated, the user can interact with the default deployment specification, to make changes to the default deployment specification. For example, in FIG. 22, the default deployment specification 2200 has determined that the filter component 2202 is to be executed in the in-memory execution unit 2204. This can be determined based on user preferences, e.g., the user may have specified a hint for the filter component to be executed in memory, and/or based on one or more rules applied to the user's target implementation environment and available resources. The user can make changes to the default deployment specification by selecting and moving, e.g., clicking and dragging, components from one execution unit to another. For example, at 2206 the user has selected the filter component 2202 and moved it to the target execution unit. This change can be incorporated dynamically into an updated deployment specification 2208 which reflects the changes specified by the user. In accordance with an embodiment, the default deployment specification 2200 and the updated deployment specification 2208 can each be stored and associated with the corresponding logical design, such that each deployment specification is available for future use.

Figure 23:
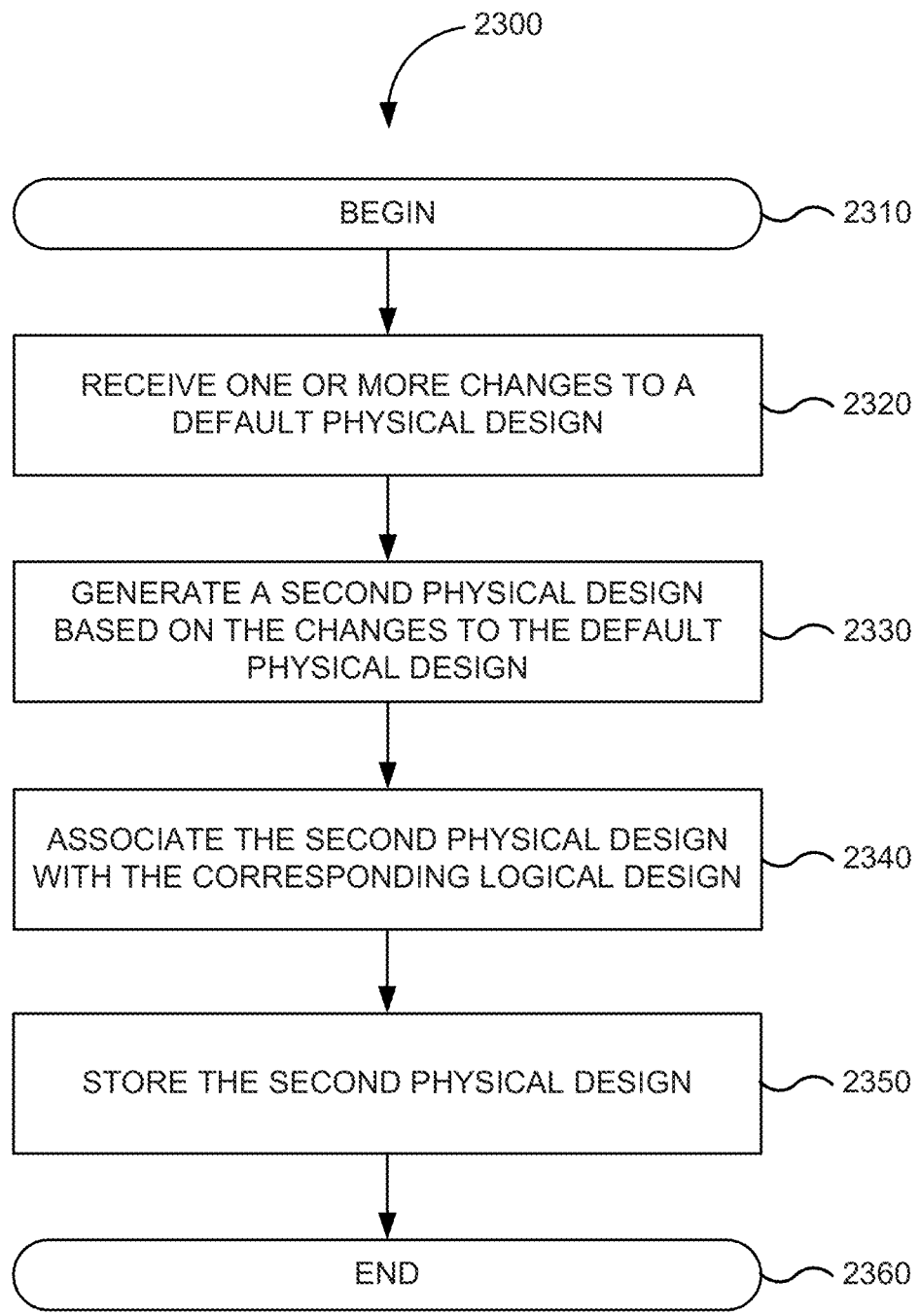
FIG. 23 depicts a flowchart of a method of generating alternative physical designs based on a logical design of a data integration mapping, in accordance with an embodiment of the present invention.

FIG. 23 depicts a flowchart of a method of generating alternative physical designs based on a logical design of a data integration mapping, in accordance with an embodiment of the present invention. Implementations of, or processing in, method 2300 depicted in FIG. 23 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 2300 depicted in FIG. 23 begins in step 2310.

In step 2320, one or more changes to a default physical design are received by the data integration system. In accordance with an embodiment, changes can be received from a user through a development environment integrated with the data integration system, such as ODI Studio provided by Oracle International Corporation. In some embodiments, changes to the physical design can be provided using a Java SDK. As described above, the changes can be received when the user selects and moves one or more components in the physical design from one execution unit to another. Additionally, or alternatively, the user can change the implementation environment to represent a different IT infrastructure, or change one or more user preferences. In step 2330, a second physical design can be generated based on the changes received to the default physical design. At step 2340, the second physical design can be associated with the underlying logical design. At step 2350, the second physical design, and its association with the underlying logical design, can be stored. FIG. 23 ends in step 2360.

Figure 24:
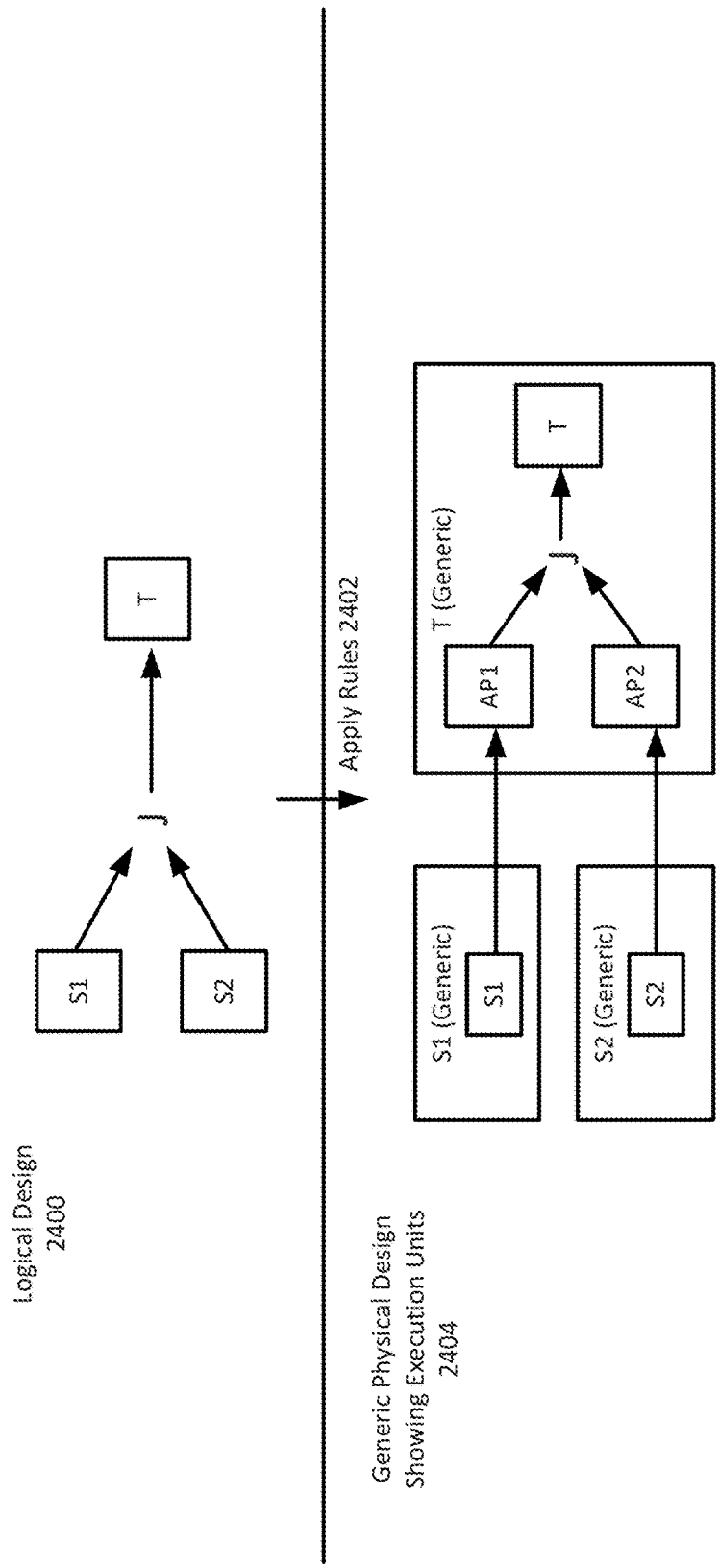
FIG. 24 illustrates the creation of a generic physical design of a data integration mapping based on a logical design, in accordance with an embodiment of the present invention.

FIG. 24 illustrates the creation of a generic physical design of a data integration mapping based on a logical design, in accordance with an embodiment of the present invention. As described above, after a user creates a logical design, a physical design can be generated for the user based on the user's preferences and their implementation environment. However, third party solutions providers typically define a data integration mapping to address a particular solution, without prior knowledge of the end user's IT infrastructure or resources. Embodiments of the present invention can be extended for use by solution providers using generic components. As shown in FIG. 24, a solutions provider can create a logical design, similar to how a user can create a logical design. This design can then be analyzed and a plurality of rules can be applied 2402 to the design to create a physical design. Rather than creating a physical design based on a known IT infrastructure, a generic physical design 2404 is created. This enables a solution provider to define a particular solution, with a known structure. That is, the overall logical and physical designs are fixed, but the user's infrastructure where the solution will be implemented is unknown. When the solution is implemented, each generic component can be bound to the user's IT infrastructure.

Code Generation from a Directed Acyclic Graph Using Knowledge Modules

Figure 25:
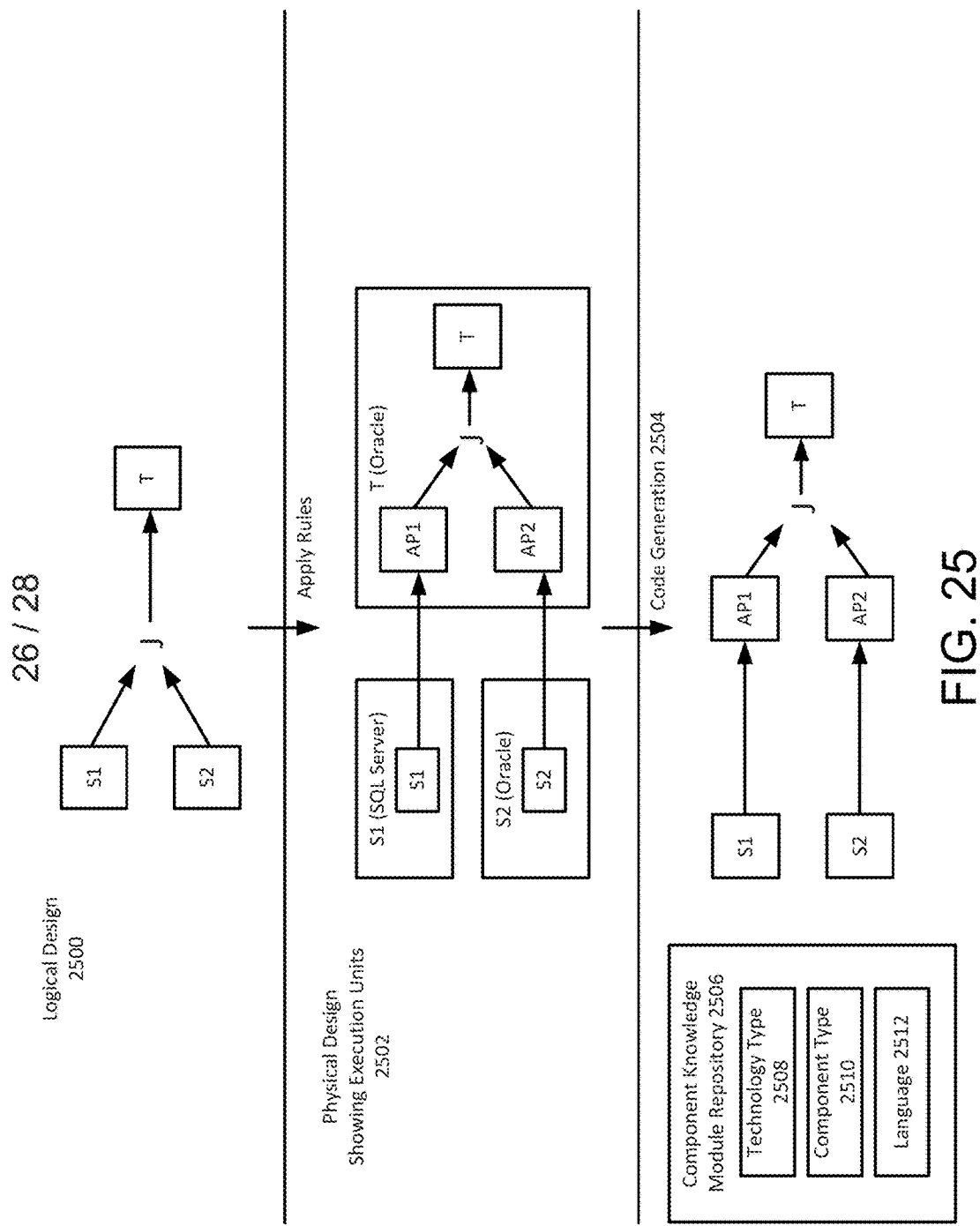
FIG. 25 illustrates code generation to implement a physical design of a data integration mapping, in accordance with an embodiment of the present invention.

FIG. 25 illustrates code generation to implement a physical design of a data integration mapping, in accordance with an embodiment of the present invention. As described above the data integration system enables users to create a logical design which is platform and technology independent. The user can create a logical design 2500 which defines, at a high level, how a user wants to manipulate data among different systems. The system can analyze the logical design, in view of the user's IT infrastructure and preferences, and create a physical design 2502. The physical design can include a plurality of components corresponding to each source and target in the design, as well as operations such as joins or filters, and access points. In accordance with an embodiment, each component can generate native code 2504 to perform operations on the data in accordance with the logical and physical designs. Knowledge modules associated with the components can generate the code based on the underlying technology (e.g., SQL Server, Oracle, Hadoop, etc.) and the language used (SQL, pig, etc.).

Under previous systems, any change to the underlying technology or language would potentially break the design. However, here, each component is assigned a template depending on the component type and Language/Technology being used. The user can add or customize these templates, each of which is based on the technology and language. This enables a logical design to support multiple IT infrastructures and survive changes to the user's IT infrastructure.

In accordance with an embodiment, each knowledge module may include one or more configurable settings. As described above, a knowledge module (KM) is a component that implements reusable transformation and ELT (extract, load, and transform) strategies across different technologies. In one aspect, knowledge modules (KMs) are code templates. Each KM can be dedicated to an individual task in an overall data integration process. The code in KMs appears in nearly the form that it will be executed with substitution methods enabling it to be used generically by many different integration jobs. For example, a join component may include an extract knowledge module which provides a code template for loading data from a datastore. If that join component is being used with an SQL server, it may automatically include a SQL extract knowledge module. If the user's IT infrastructure changes, to a Hadoop/Pig implementation, a Pig extract knowledge module may be substituted. Thus, changes to the user's infrastructure do not break the user's preexisting designs, instead each design can quickly adapt to those changes.

In accordance with an embodiment, each knowledge module can include one or more configurable options depending on the technology and language associated with that knowledge module. For example, in Pig, as compared to SQL, various properties such as the type of algorithm to use or partition information can be specified. This enables users to take advantage of functionality that is not shared across different technologies/languages, but is instead specific to a particular technology/language.

As shown in FIG. 25, a component knowledge module repository 2506 can include a plurality of knowledge modules which can be applied as needed based on a user's physical design. The knowledge modules can be specific to a technology type 2508, component type 2510, and language 2512. For example a join component may be associated with a variety of knowledge modules for loading, extracting, and joining data. Depending on the implementation environment, different knowledge modules may be selected for each of these operations. For example, an Oracle/SQL implementation may have different knowledge modules than a Hadoop/Pig implementation, and each knowledge module can be configured to take advantage of options and functionality specific to that implementation technology/language.

As described above, each physical design represents a directed, acyclic graph of execution units and execution unit groups. Each execution unit group is executed serially, one after the next, and execution units within an execution unit group can be executed in parallel. As also described above, by generating native code for each step of the data integration mapping (as represented by each execution unit), the need for a dedicated transform server, as required by traditional ETL methods, can be obviated. This enables the user to leverage the resources available to them through their existing infrastructure, e.g. their current database server and data processing capabilities. Code generated using the knowledge modules can be executed according to the physical design to effect the data integration mapping expressed in the logical design.

Figure 26:
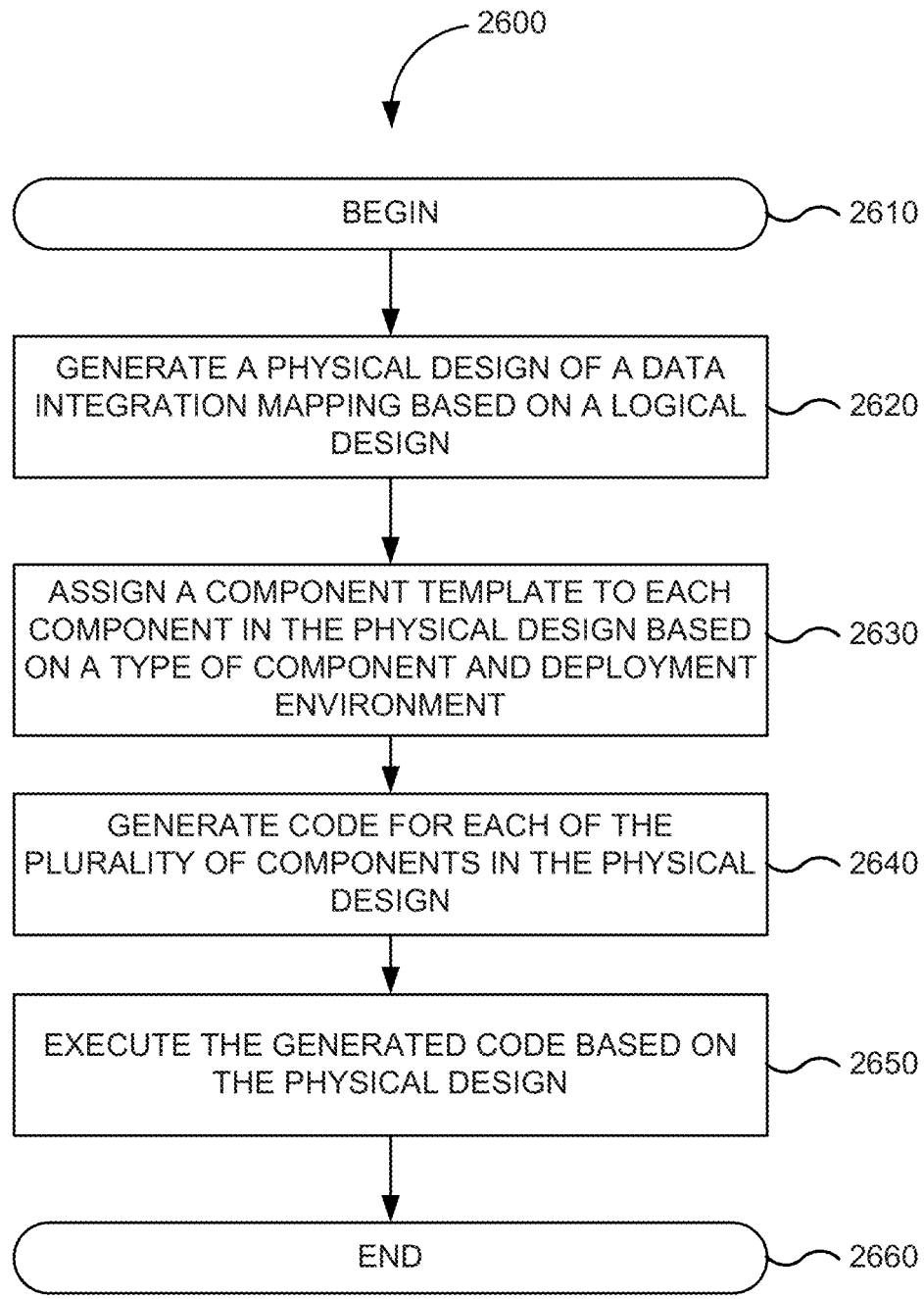
FIG. 26 depicts a flowchart of a method of generating alternative physical designs based on a logical design of a data integration mapping, in accordance with an embodiment of the present invention.

FIG. 26 depicts a flowchart of a method of generating alternative physical designs based on a logical design of a data integration mapping, in accordance with an embodiment of the present invention. Implementations of, or processing in, method 2600 depicted in FIG. 26 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 2600 depicted in FIG. 26 begins in step 2610.

In step 2620, a physical design of a data integration mapping is generated based on a logical design. As described above, the generation of the physical design can be based on the user's deployment environment and one or more user preferences provided during creation of the logical design. For example, one or more execution hints can be provided which embody user preferences regarding where or how a particular operation should be executed. The physical design can comprise a plurality of execution units which can include a plurality of components. In step 2330, a knowledge module can be assigned to each component in the physical design. Each knowledge module can include one or more configurable settings which can be automatically configured by the data integration system based on the user's implementation environment. Depending on the technology/language of the user's implementation, the knowledge module can include technology/language specific configurable settings. In the event of changes to the underlying technology/language of the user's implementation environment, new knowledge modules can assigned based on those changes which include configurable settings for the new underlying technology/language. This makes the designs robust and adaptable.

At step 2640, code is generated for each component in the physical design using the knowledge modules. As described above, each knowledge module represents a code template specific to the component, technology, and language types of the physical design. At step 2650, the generated code is executed based on the physical design to effect the data integration mapping embodied in the logical design. As described above, the physical design represents a directed, acyclic graph. Code generated for each component can be executed according to the order specified in the graph, with the results of each component's execution being passed to the next component in the graph. In some embodiments, components in the physical design can be identified and processed depth-first, such that knowledge modules associated with source components are processed first. In some embodiments, all knowledge modules for a particular language share a data structure that can be used to produce the desired code. For example, when generating SQL code, a data structure resembling a SQL query is used. In accordance with an embodiment, the generated code can be simulated and displayed before being deployed. FIG. 26 ends in step 2660.

CONCLUSION

Figure 27:
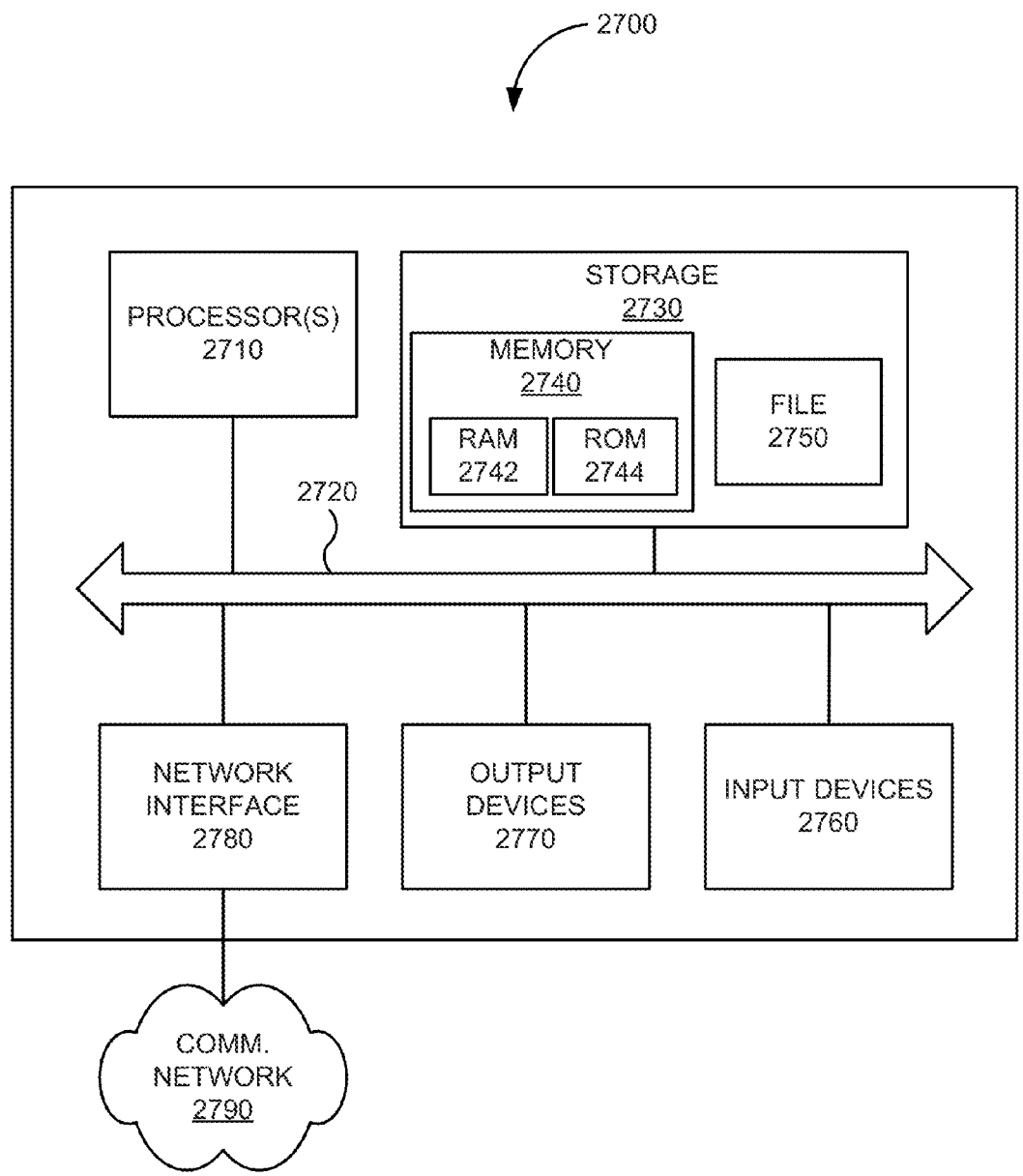
FIG. 27 is a simplified block diagram of computer system 2700 that may be used to practice embodiments of the present invention.

FIG. 27 is a simplified block diagram of computer system 2700 that may be used to practice embodiments of the present invention. As shown in FIG. 27, computer system 2700 includes processor 2710 that communicates with a number of peripheral devices via bus subsystem 2720. These peripheral devices may include storage subsystem 2730, comprising memory subsystem 2740 and file storage subsystem 2750, input devices 2760, output devices 2770, and network interface subsystem 2780.

Bus subsystem 2720 provides a mechanism for letting the various components and subsystems of computer system 2700 communicate with each other as intended. Although bus subsystem 2720 is shown schematically as a single bus, alternative embodiments of the bus subsystem may utilize multiple busses.

Storage subsystem 2730 may be configured to store the basic programming and data constructs that provide the functionality of the present invention. Software (code modules or instructions) that provides the functionality of the present invention may be stored in storage subsystem 2730. These software modules or instructions may be executed by processor(s) 2710. Storage subsystem 2730 may also provide a repository for storing data used in accordance with the present invention. Storage subsystem 2730 may comprise memory subsystem 2740 and file/disk storage subsystem 2750.

Memory subsystem 2740 may include a number of memories including a main random access memory (RAM) 2742 for storage of instructions and data during program execution and a read only memory (ROM) 2744 in which fixed instructions are stored. File storage subsystem 2750 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 2760 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 2700.

Output devices 2770 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 2700.

Network interface subsystem 2780 provides an interface to other computer systems, devices, and networks, such as communications network 2790. Network interface subsystem 2780 serves as an interface for receiving data from and transmitting data to other systems from computer system 2700. Some examples of communications network 2790 are private networks, public networks, leased lines, the Internet, Ethernet networks, token ring networks, fiber optic networks, and the like.

Computer system 2700 can be of various types including a personal computer, a portable computer, a workstation, a network computer, a mainframe, a kiosk, or any other data processing system. Due to the ever-changing nature of computers and networks, the description of computer system 2700 depicted in FIG. 27 is intended only as a specific example for purposes of illustrating the preferred embodiment of the computer system. Many other configurations having more or fewer components than the system depicted in FIG. 27 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method of generating code for data integration based on a logical design, comprising:
   generating, using a computer including a computer readable medium and processor, a physical design of a data integration process based on a logical design of the data integration process, wherein the physical design includes a plurality of execution units and the physical design is a physical implementation corresponding to physical devices;
   assigning a knowledge module to each of a plurality of components in the plurality of execution units, wherein each knowledge module is specific to a type of component and a deployment's language and technology type, and wherein the knowledge module is a code template and is configured to implement reusable transformation, and each knowledge module is customizable by a user;
   generating code for each of the plurality of execution units in the physical design, based on the assigned knowledge modules, wherein the code that is generated is derived from declarative rules and metadata defined for each of the knowledge modules; and
   executing the generated code in an order based on the physical design.

2. The method of claim 1 wherein each knowledge module includes one or more configurable settings.

3. The method of claim 2 wherein each knowledge module is the code template specific to a component type, a technology type, and a language type.

4. The method of claim 3 wherein each knowledge module includes one or more user configurable component, technology, or language options.

5. The method of claim 1 wherein the physical design is a directed, acyclic graph which indicates the order of execution of the generated code.

6. The method of claim 5, wherein a data structure representing code generated for each execution unit having a same language is created and passed to a next execution unit having the same language in the physical design.

7. The method of claim 1 wherein executing the generated code comprises:
   simulating code generation; and
   displaying the generated code.

8. A non-transitory computer readable storage medium including instructions stored thereon which, when executed by a processor cause the processor to perform the steps of:
   generating, using a computer including a computer readable medium and processor, a physical design of a data integration process based on a logical design of the data integration process, wherein the physical design includes a plurality of execution units and the physical design is a physical implementation corresponding to physical devices;
   assigning a knowledge module to each of a plurality of components in the plurality of execution units, wherein each knowledge module is specific to a type of component and a deployment's language and technology type, and wherein the knowledge module is a code template and is configured to implement reusable transformation, and each knowledge module is customizable by a user;
   generating code for each of the plurality of execution units in the physical design, based on the assigned knowledge modules, wherein the code that is generated is derived from declarative rules and metadata defined for each of the knowledge modules; and
   executing the generated code in an order based on the physical design.

9. The non-transitory computer readable storage medium of claim 8 wherein each knowledge module includes one or more configurable settings.

10. The non-transitory computer readable storage medium of claim 9, wherein each knowledge module is the code template specific to a component type, a technology type, and a language type.

11. The non-transitory computer readable storage medium of claim 10 wherein each knowledge module includes one or more user configurable component, technology, or language options.

12. The non-transitory computer readable storage medium of claim 8 wherein the physical design is a directed, acyclic graph which indicates the order of execution of the generated code.

13. The non-transitory computer readable storage medium of claim 12, wherein a data structure representing code generated for each execution unit having a same language is created and passed to a next execution unit having the same language in the physical design.

14. The non-transitory computer readable storage medium of claim 8 wherein executing the generated code comprises:
   simulating code generation; and
   displaying the simulated code.

15. A system of generating code for data integration based on a logical design, comprising:
   a data integration system comprising one or more computing devices each including a computer readable medium and processor, wherein the data integration system is configured to
      generating a physical design of a data integration process based on a logical design of the data integration process, wherein the physical design includes a plurality of execution units and the physical design is a physical implementation corresponding to physical devices;
      assigning a knowledge module to each of a plurality of components in the plurality of execution units, wherein each knowledge module is specific to a type of component and a deployment's language and technology type, and wherein the knowledge module is a code template and is configured to implement reusable transformation, and each knowledge module is customizable by a user;

generating code for each of the plurality of components in the physical design, based on the assigned knowledge modules, wherein the code that is generated is derived from declarative rules and metadata defined for each of the knowledge modules; and executing the generated code in an order based on the physical design.

16. The system of claim 15 wherein each knowledge module includes one or more configurable settings, and wherein each knowledge module is a code template specific to a component type, technology type, and language type.

17. The system of claim 16 wherein each knowledge module includes one or more user configurable component, technology, or language options.

18. The system of claim 15 wherein the physical design is a directed, acyclic graph which indicates the order of execution of the generated code.

19. The system of claim 18 wherein a data structure representing code generated for each execution unit having a same language is created and passed to a next execution unit having the same language in the physical design.

20. The system of claim 15 wherein executing the generated code comprises:

simulating code generation; and displaying the simulated code.

21. The method according to claim 1, wherein the physical design comprises heterogeneous hardware platforms.

22. The method according to claim 1, wherein the plurality of execution units correspond to servers in a known IT infrastructure of the user.

23. The method according to claim 1, wherein the physical design incorporates a plurality of different infrastructures.

24. The method according to claim 1, wherein the knowledge module is configured to implement extract, load, and transform (ELT) operations across a plurality of different technologies.

25. The method according to claim 1, wherein the knowledge module comprises one of an integration knowledge module (IKM), a loading knowledge module (LKM), and a check knowledge module (CKM).

* * * * *

UNITED STATES PATENT AND TRADEMARK OFFICE
CERTIFICATE OF CORRECTION

PATENT NO. : 10,073,867 B2  
APPLICATION NO. : 14/077135  
DATED : September 11, 2018  
INVENTOR(S) : Lau et al.

It is certified that error appears in the above-identified patent and that said Letters Patent is hereby corrected as shown below:

In the Drawings

On sheet 2 of 28, in FIG. 2, under Reference Numeral 216, Line 2, delete "MANAGMENT" and insert -- MANAGEMENT --, therefor.

In the Specification

In Column 16, Line 26, after "etc.)" insert -- . --.

In Column 26, Line 46, after "can" insert -- be --.

Signed and Sealed this  
Ninth Day of July, 2019

Andrei Iancu  
*Director of the United States Patent and Trademark Office*